(12) United States Patent
Kudo et al.

(10) Patent No.: US 11,854,185 B2
(45) Date of Patent: Dec. 26, 2023

(54) INDIVIDUAL IDENTIFICATION APPARATUS

(71) Applicant: NEC Corporation, Tokyo (JP)

(72) Inventors: Yuta Kudo, Tokyo (JP); Rui Ishiyama, Tokyo (JP); Toru Takahashi, Tokyo (JP); Kengo Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 248 days.

(21) Appl. No.: 17/296,019

(22) PCT Filed: Nov. 29, 2018

(86) PCT No.: PCT/JP2018/044062
§ 371 (c)(1),
(2) Date: May 21, 2021

(87) PCT Pub. No.: WO2020/110269
PCT Pub. Date: Jun. 4, 2020

(65) Prior Publication Data
US 2022/0036530 A1    Feb. 3, 2022

(51) Int. Cl.
*G06T 7/00*     (2017.01)
*G06T 7/49*     (2017.01)
(Continued)

(52) U.S. Cl.
CPC .............. *G06T 7/001* (2013.01); *G06T 7/337* (2017.01); *G06T 7/49* (2017.01); *G06V 10/40* (2022.01)

(58) Field of Classification Search
CPC ...... G06V 20/80; G06V 10/46; G06V 10/462; G06V 10/40; G06T 7/0002; G06T 7/001;
(Continued)

(56) References Cited

U.S. PATENT DOCUMENTS

2008/0219503 A1* 9/2008 Di Venuto ............. G07D 7/121
382/103
2009/0110295 A1* 4/2009 Ogaki .................... G06V 20/80
382/209
(Continued)

FOREIGN PATENT DOCUMENTS

JP    2011-145958 A      7/2011
JP    2011145958 A  *   7/2011   ......... G06K 9/00288
(Continued)

OTHER PUBLICATIONS

International Search Report for PCT Application No. PCT/JP2018/044062, dated Feb. 19, 2019.
IB345 and PCT Administrative Instructions Part 8.

*Primary Examiner* — Ian L Lemieux
*Assistant Examiner* — Woo C Rhim

(57) ABSTRACT

An individual identification apparatus that identifies an individual product having a pattern of irregularities randomly formed on a surface thereof includes an imaging unit and an extracting unit. The imaging unit is configured to acquire an image obtained by capturing a date mark formed on the product. The extracting unit is configured to extract a feature value related to the pattern of the irregularities from the image as data identifying the individual product.

13 Claims, 40 Drawing Sheets

(51) Int. Cl.
*G06T 7/33* (2017.01)
*G06V 10/40* (2022.01)

(58) Field of Classification Search
CPC . G06T 7/49; G06T 7/337; G06F 16/58; G06F 16/583
See application file for complete search history.

(56) References Cited

U.S. PATENT DOCUMENTS

| | | | | |
|---|---|---|---|---|
| 2011/0179052 | A1* | 7/2011 | Sato | G06V 10/75 707/758 |
| 2012/0243797 | A1* | 9/2012 | Di Venuto Dayer | G06V 40/1371 382/218 |
| 2014/0140570 | A1* | 5/2014 | Ross | G06T 7/0008 382/100 |
| 2015/0116543 | A1* | 4/2015 | Mitarai | G06V 10/993 348/231.6 |
| 2015/0186753 | A1* | 7/2015 | Horita | G06V 10/457 382/199 |
| 2015/0189238 | A1* | 7/2015 | Ishiyama | G06T 7/40 348/86 |
| 2015/0205855 | A1* | 7/2015 | Takahashi | G06F 16/285 707/737 |
| 2016/0042245 | A1* | 2/2016 | Ishiyama | G06V 20/80 382/190 |
| 2016/0048730 | A1* | 2/2016 | Ishiyama | G06V 10/22 382/108 |
| 2016/0055398 | A1* | 2/2016 | Ishiyama | G06V 10/26 382/190 |
| 2016/0275368 | A1* | 9/2016 | Akiyama | G06Q 10/083 |
| 2017/0091611 | A1* | 3/2017 | Soborski | G06K 19/06037 |
| 2017/0262680 | A1* | 9/2017 | Voigt | G06F 18/22 |
| 2017/0287147 | A1* | 10/2017 | Takahashi | G06T 7/35 |
| 2017/0344823 | A1* | 11/2017 | Withrow | G06F 21/30 |
| 2018/0144211 | A1* | 5/2018 | Ross | G06T 7/0004 |
| 2018/0286033 | A1* | 10/2018 | Ishiyama | G06V 20/80 |
| 2019/0306415 | A1* | 10/2019 | Seto | H04N 23/661 |
| 2020/0019810 | A1 | 1/2020 | Takahashi et al. | |

FOREIGN PATENT DOCUMENTS

| | | | | |
|---|---|---|---|---|
| JP | 2014029678 A | * | 2/2014 | |
| JP | 2015173344 A | * | 10/2015 | |
| JP | 2017084377 A | * | 5/2017 | ......... G06Q 30/0623 |
| WO | WO-2017002475 A1 | * | 1/2017 | ........... G06K 19/086 |
| WO | WO-2017038432 A1 | * | 3/2017 | ............ B42D 25/378 |
| WO | 2017/057448 A1 | | 4/2017 | |
| WO | WO-2017159384 A1 | * | 9/2017 | ......... G06K 9/00496 |
| WO | WO-2018106799 A1 | * | 6/2018 | ............ G06F 16/50 |
| WO | 2018/179092 A1 | | 10/2018 | |

* cited by examiner

11 DATE MARK

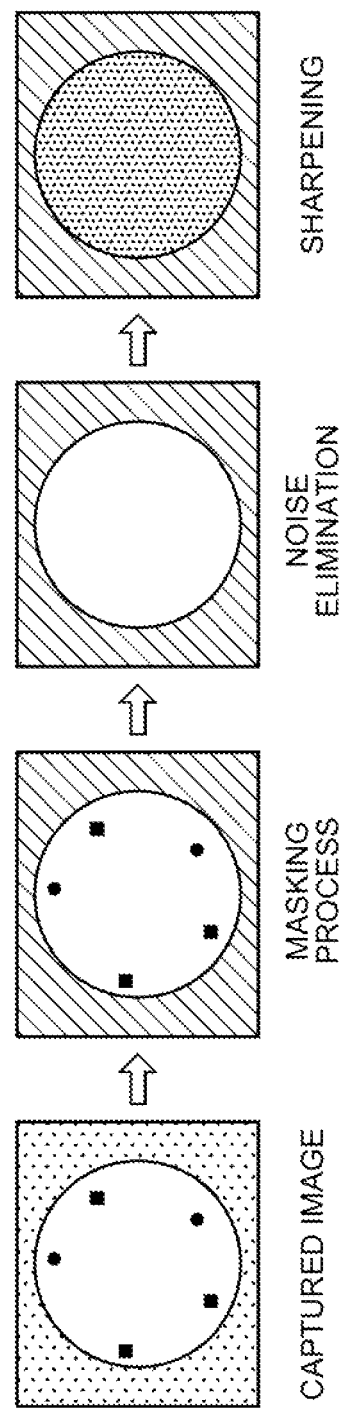

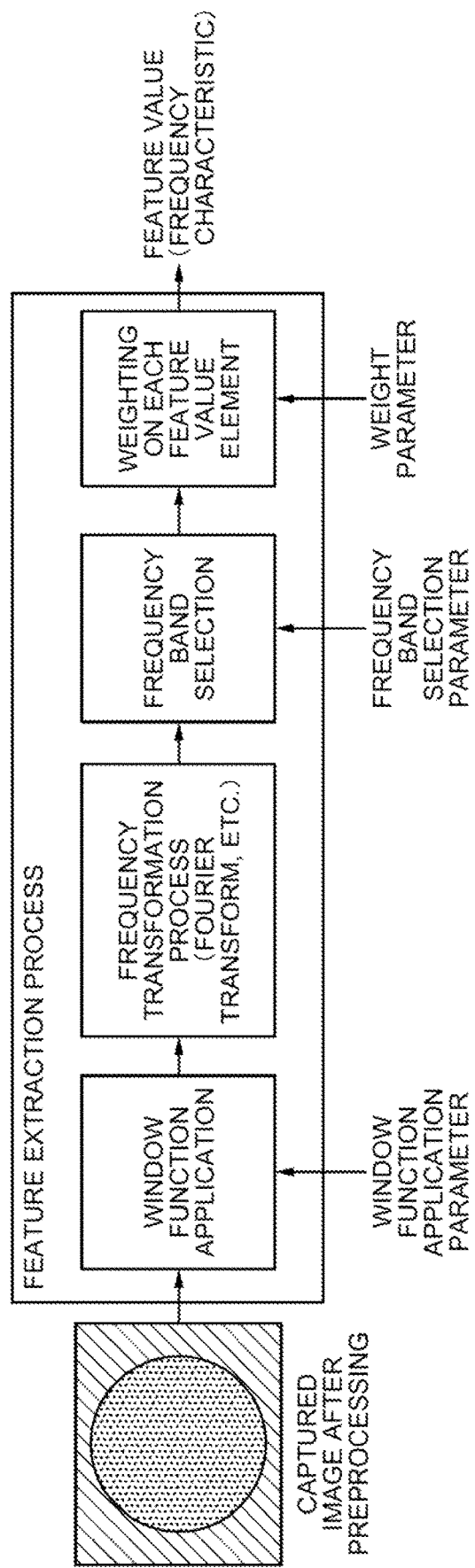

FIG. 9

| MODEL NUMBER OF MOLD DATE MARK | PARAMETER | | | |
|---|---|---|---|---|
| | IMAGE CAPTURE PARAMETER | | IMAGE PROCESSING PARAMETER | |
| | ILLUMINATION ANGLE | IMAGE RESOLUTION | PREPROCESSING PARAMETER | FEATURE EXTRACTION PARAMETER |
| XXX001 | | | | |
| ... | | | | |

FIG. 10

| CANDIDATE | ILLUMINATION ANGLE | IMAGE RESOLUTION | PREPROCESSING PARAMETER SET | FEATURE EXTRACTION PARAMETER SET |
|---|---|---|---|---|
| a1 | θ1 | m1 | pr1 | eq1 |
| a2 | θ1 | m1 | pr1 | eq2 |
| a3 | θ1 | m1 | pr1 | eq3 |
| ... | ... | ... | ... | ... |
| an | θa | mb | prc | eqd |

FIG. 11

| CANDIDATE | POSTURE |
|---|---|
| b1 | POSTURE p1 |
| ⋮ | ⋮ |
| bm | POSTURE pm |

FIG. 12

| A | SAMPLE ID | B=b1 | B=b2 | ... | B=bm |
|---|---|---|---|---|---|
| a1 | 001 | IMAGE G111 | IMAGE G112 | ... | IMAGE G11m |
| | 002 | IMAGE G211 | IMAGE G212 | ... | IMAGE G21m |
| | ... | ... | ... | ... | ... |
| | N | IMAGE GN11 | IMAGE GN12 | ... | IMAGE GN1m |
| a2 | 001 | IMAGE G121 | IMAGE G122 | ... | IMAGE G12m |
| | 002 | IMAGE G221 | IMAGE G222 | ... | IMAGE G22m |
| | ... | ... | ... | ... | ... |
| | N | IMAGE GN21 | IMAGE GN22 | ... | IMAGE GN2m |
| ... | ... | ... | ... | ... | ... |
| an | 001 | IMAGE G1n1 | IMAGE G1n2 | ... | IMAGE G1nm |
| | 002 | IMAGE G2n1 | IMAGE G2n2 | ... | IMAGE G2nm |
| | ... | ... | ... | ... | ... |
| | N | IMAGE GNn1 | IMAGE GNn2 | ... | IMAGE GNnm |

FIG. 13

| A | SAMPLE ID | B=b1 | ... | B=bm |
|---|---|---|---|---|
| a1 | 001 | FEATURE VALUE V111 | ... | FEATURE VALUE V11m |
| | 002 | FEATURE VALUE V211 | ... | FEATURE VALUE V21m |
| | ... | ... | ... | ... |
| | N | FEATURE VALUE VN11 | ... | FEATURE VALUE VN1m |
| a2 | 001 | FEATURE VALUE V121 | ... | FEATURE VALUE V12m |
| | 002 | FEATURE VALUE V221 | ... | FEATURE VALUE V22m |
| | ... | ... | ... | ... |
| | N | FEATURE VALUE VN21 | ... | FEATURE VALUE VN2m |
| ... | ... | ... | ... | ... |
| an | 001 | FEATURE VALUE V1n1 | ... | FEATURE VALUE V1nm |
| | 002 | FEATURE VALUE V2n1 | ... | FEATURE VALUE V2nm |
| | ... | ... | ... | ... |
| | N | FEATURE VALUE VNn1 | ... | FEATURE VALUE VNnm |

FIG. 14

| A | FIRST FEATURE VALUE PAIR |
|---|---|
| a1 | COMBINATION OF TWO SELECTED FROM M FEATURE VALUES (V111, V112, ..., V11m) |
| | COMBINATION OF TWO SELECTED FROM M FEATURE VALUES (V211, V212, ..., V21m) |
| | ⋮ |
| | COMBINATION OF TWO SELECTED FROM M FEATURE VALUES (VN11, VN12, ..., VN1m) |
| a2 | COMBINATION OF TWO SELECTED FROM M FEATURE VALUES (V121, V122, ..., V12m) |
| | COMBINATION OF TWO SELECTED FROM M FEATURE VALUES (V221, V222, ..., V22m) |
| | ⋮ |
| | COMBINATION OF TWO SELECTED FROM M FEATURE VALUES (VN21, VN22, ..., VN2m) |
| ... | ... |
| an | COMBINATION OF TWO SELECTED FROM M FEATURE VALUES (V1n1, V1n2, ..., V1nm) |
| | COMBINATION OF TWO SELECTED FROM M FEATURE VALUES (V2n1, V2n2, ..., V2nm) |
| | ⋮ |
| | COMBINATION OF TWO SELECTED FROM M FEATURE VALUES (VNn1, VNn2, ..., VNnm) |

FIG. 15

| A | SECOND FEATURE VALUE PAIR |
|---|---|
| a1 | COMBINATION OF FEATURE VALUE $V11x$ ($x=1, 2, \cdots, m$) AND FEATURE VALUE $Viyy$ ($i \neq 1$, y MAY BE ANY VALUE) |
| | COMBINATION OF FEATURE VALUE $V21x$ ($x=1, 2, \cdots, m$) AND FEATURE VALUE $Viyy$ ($i \neq 2$, y MAY BE ANY VALUE) |
| | $\vdots$ |
| | COMBINATION OF FEATURE VALUE $VN1x$ ($x=1, 2, \cdots, m$) AND FEATURE VALUE $Viyy$ ($i \neq N$, y MAY BE ANY VALUE) |
| a2 | COMBINATION OF FEATURE VALUE $V12x$ ($x=1, 2, \cdots, m$) AND FEATURE VALUE $Viyy$ ($i \neq 1$, y MAY BE ANY VALUE) |
| | COMBINATION OF FEATURE VALUE $V22x$ ($x=1, 2, \cdots, m$) AND FEATURE VALUE $Viyy$ ($i \neq 2$, y MAY BE ANY VALUE) |
| | $\vdots$ |
| | COMBINATION OF FEATURE VALUE $VN2x$ ($x=1, 2, \cdots, m$) AND FEATURE VALUE $Viyy$ ($i \neq N$, y MAY BE ANY VALUE) |
| $\cdots$ | $\cdots$ |
| an | COMBINATION OF FEATURE VALUE $V1nx$ ($x=1, 2, \cdots, m$) AND FEATURE VALUE $Viyy$ ($i \neq 1$, y MAY BE ANY VALUE) |
| | COMBINATION OF FEATURE VALUE $V2nx$ ($x=1, 2, \cdots, m$) AND FEATURE VALUE $Viyy$ ($i \neq 2$, y MAY BE ANY VALUE) |
| | $\vdots$ |
| | COMBINATION OF FEATURE VALUE $VNnx$ ($x=1, 2, \cdots, m$) AND FEATURE VALUE $Viyy$ ($i \neq N$, y MAY BE ANY VALUE) |

FIG. 16

| A | DISTRIBUTION OF SCORES OF FIRST FEATURE VALUE PAIRS (FIRST DISTRIBUTION) | DISTRIBUTION OF SCORES OF SECOND FEATURE VALUE PAIRS (SECOND DISTRIBUTION) | SEPARATION DEGREE |
|---|---|---|---|
| a1 | DISTRIBUTION D11 | DISTRIBUTION D12 | SP1 |
| a2 | DISTRIBUTION D21 | DISTRIBUTION D22 | SP2 |
| ⋮ | ⋮ | ⋮ | ⋮ |
| an | DISTRIBUTION Dn1 | DISTRIBUTION Dn2 | SPn |

FIG. 23

| FEATURE VALUE | SUPPLEMENTARY INFORMATION |
|---|---|
| FEATURE VALUE PF1 | SUPPLEMENTARY INFORMATION SI1 |
| FEATURE VALUE PF2 | SUPPLEMENTARY INFORMATION SI2 |
| ⋮ | ⋮ |
| FEATURE VALUE PFn | SUPPLEMENTARY INFORMATION SIn |

250 FEATURE VALUE MANAGEMENT APPARATUS

INDIVIDUAL IDENTIFICATION APPARATUS

This application is a National Stage Entry of PCT/JP2018/044062 filed on Nov. 29, 2018, the contents of all of which are incorporated herein by reference, in their entirety.

TECHNICAL FIELD

The present invention relates to an individual identification apparatus, an individual identification method, a recording medium, an individual registration apparatus, and an individual matching apparatus.

BACKGROUND ART

One method for ensuring the traceability of products is forming a mark displaying a character string such as a manufacture date or a lot number on the surface of a product during the process of manufacturing the product. The above-mentioned mark formed on the surface of a product is called a date mark. For example, by forming date marks displaying the same character string on products of the same lot produced on the same day using the same manufacturing machine, the product lot can be visually identified.

On the other hand, an attempt to use an individual difference in fine pattern formed on the surface of an object for authentication and matching has been made. For example, Patent Document 1 describes attaching a mark such as a character and a symbol and a label displaying a fine pattern to an object, acquiring an image of the fine pattern from a predetermined region on the label determined based on the mark, and using the image for authentication and matching of the object.

Patent Document 1: Japanese Translation of PCT International Application Publication WO2017/057448

In a case where the required accuracy of traceability is high, there is a need to make a lot small and manage individual products. Forming a date mark displaying a serial number of each product during the process of manufacturing the product enables management of individual products, but the manufacturing cost is high.

On the other hand, the method described in Patent Document 1 enables management of individual products, but it is required to execute special processing for identification, that is, attach a mark such as a character and a label displaying a fine pattern on an object, and the manufacturing cost is still high.

SUMMARY

An object of the present invention is to provide an individual identification apparatus which solves the above-mentioned problem that the method of displaying a serial number of each product in a date mark and managing an individual product increases the manufacturing cost.

An individual identification apparatus according to an aspect of the present invention is an individual identification apparatus that identifies an individual product having a pattern of irregularities randomly formed on a surface thereof. The individual identification apparatus includes an imaging unit configured to acquire an image obtained by capturing a date mark formed on the product, and an extracting unit configured to extract a feature value related to the pattern of the irregularities from the image obtained by capturing the date mark as data identifying the individual product.

Further, an individual identification method according to another aspect of the present invention is an individual identification method of identifying an individual product having a pattern of irregularities randomly formed on a surface thereof. The individual identification method includes: acquiring an image obtained by capturing a date mark formed on the product; and extracting a feature value related to the pattern of the irregularities from the image obtained by capturing the date mark as data identifying the individual product.

Further, a non-transitory computer-readable recording medium according to another aspect of the present invention is a non-transitory computer-readable recording medium on which a program is recorded. The program includes instructions for causing a computer that identifies an individual product having a pattern of irregularities randomly formed on a surface thereof, to perform: a process of acquiring an image obtained by capturing a date mark formed on the product; and a process of extracting a feature value related to the pattern of the irregularities from the image obtained by capturing the date mark as data identifying the individual product.

Further, an individual registration apparatus according to another aspect of the present invention includes: a condition setting unit configured to, from a parameter database in which, for each model number of a mold date mark, an image capture parameter related to a condition for capturing an image of a date mark of a product manufactured using the mold date mark and an image processing parameter related to a condition for extracting a feature value related to a pattern of irregularities from the image of the date mark are stored so as to be associated with the model number of the mold date mark, acquire the image capture parameter and the image processing parameter associated with a model number of a mold date mark used for manufacturing a registration target product, and set an image capture condition and an image processing condition determined by the acquired image capture parameter and image processing parameter; an imaging unit configured to acquire an image obtained by capturing a date mark formed on the registration target product under the set image capture condition; and a feature value extracting unit configured to, under the set image processing condition, extract the feature value related to the pattern of the irregularities from the image obtained by capturing the date mark as a feature value of the registration target product, and register into a feature value database.

Further, an individual matching apparatus according to another aspect of the present invention includes: a condition setting unit configured to, from a parameter database in which, for each model number of a mold date mark, an image capture parameter related to a condition for capturing an image of a date mark of a product manufactured using the mold date mark and an image processing parameter related to a condition for extracting a feature value related to a pattern of irregularities from the image of the date mark are stored so as to be associated with the model number of the mold date mark, acquire the image capture parameter and the image processing parameter associated with a model number of a mold date mark used for manufacturing a matching target product, and set an image capture condition and an image processing condition determined by the acquired image capture parameter and image processing parameter; an imaging unit configured to acquire an image obtained by capturing a date mark formed on the matching target product under the set image capture condition; a feature value extracting unit configured to, under the set image processing condition, extract the feature value related to the pattern of the irregularities from the image obtained by capturing the date mark as a feature value of the matching target product; and a matching unit configured to match the feature value of the matching target product against a registration feature value.

With the configurations described above, the present invention makes it possible to limit the manufacturing cost in the case of managing individual products with date marks.

BRIEF DESCRIPTION OF DRAWINGS

FIG. 2 is a view showing the overview of preprocessing performed on a date mark image in a first example embodiment of the present invention;

FIG. 3 is a view showing the overview of a feature extraction process in the first example embodiment of the present invention;

FIG. 9 is a view showing an example of the content of a parameter storage unit in the individual identification apparatus according to the first example embodiment of the present invention;

FIG. 10 is a view showing an example of candidates for values of a parameter set A in the individual identification apparatus according to the first example embodiment of the present invention;

FIG. 11 is a view showing an example of candidates for values of a parameter set B in the individual identification apparatus according to the first example embodiment of the present invention;

FIG. 12 is a view showing an example of the content of an image storage unit in the individual identification apparatus according to the first example embodiment of the present invention;

FIG. 13 is a view showing an example of the content of a feature value storage unit in the individual identification apparatus according to the first example embodiment of the present invention;

FIG. 14 is a view showing an example of the content of a first feature value pair storage unit in the individual identification apparatus according to the first example embodiment of the present invention;

FIG. 15 is a view showing an example of the content of a second feature value pair storage unit in the individual identification apparatus according to the first example embodiment of the present invention;

FIG. 16 is a view showing an example of the content of a distribution storage unit in the individual identification apparatus according to the first example embodiment of the present invention;

FIG. 23 is a view showing an example of the content of individual registration information stored in the feature value storage unit in the individual identification apparatus according to the first example embodiment of the present invention;

EXAMPLE EMBODIMENTS

First Example Embodiment

Next, a first example embodiment of the present invention will be described in detail with reference to the drawings. First, the overview of individual identification in this example embodiment will be described with reference to FIGS. 1A to 1D.

Figure 1A:
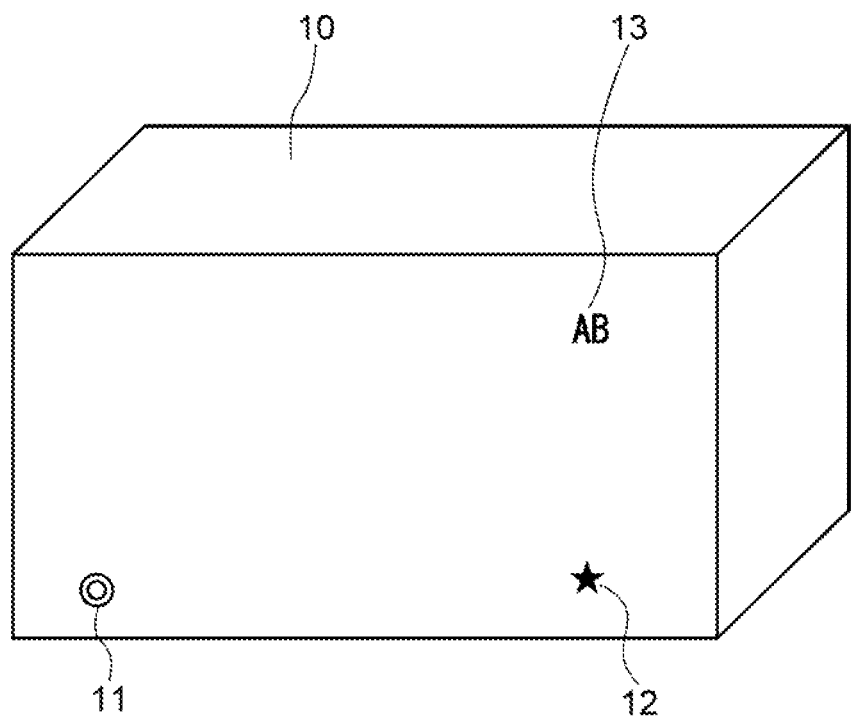
FIG. 1A is an external perspective view showing an example of a product with a date mark.
Figure 1B:
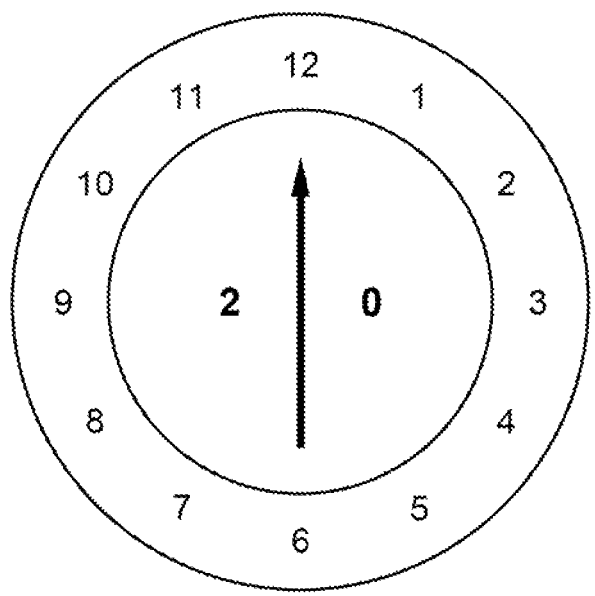
FIG. 1B is a plan view showing an example of the date mark.

FIG. 1A is an external perspective view showing an example of a product with a date mark. A product 10 shown in FIG. 1A has a date mark 11 formed on one surface thereof. FIG. 1B is a plan view showing an example of the date mark 11. The date mark 11 of FIG. 1B shows the year of manufacture by a number displayed in the center and shows the month of manufacture by a number indicated by an arrow displayed in the center among numbers displayed in the peripheral portion. The date mark 11 of this example displays that the month and year of manufacture is December 2020. The display of the date mark shown in FIG. 1B is merely an example. There are various types of date marks, such as a type that displays only the year of manufacture, a type that displays only the month of manufacture, a type that displays the date of manufacture, and a type that displays a lot number. The present invention is applicable to any display type of date mark.

In general, the product 10 with the date mark 11 as shown in FIG. 1A is manufactured by a molding method such as die casting, casting, or injection molding. To be specific, the product 10 is manufactured by pouring a material such as metal or resin into a product mold incorporating a mold date mark. Therefore, as the date mark 11 of the product 10, a three-dimensional character obtained by reversing a character (a reversed character) engraved on the mold date mark is formed on a base material. The depth of the character is generally about a few tenths of a millimeter, but is not constant depending on the outer diameter size of the date mark 11. In a case where a plurality of products 10 are manufactured using product molds incorporating mold date marks having the same engraved characters, the date marks 11 that look the same are formed on the respective products 10. However, in reality, the poured material does not flow to every corner of the irregularities of the mold date mark in the same manner at the micro level at all times and does not coagulate in the same manner. For every manufacture of an individual product, a fine difference in flow and coagulation action is made. Due to such a micro difference, a fine difference in three-dimensional shape is made in the details of the engraved characters on the date mark 11 and the surface between the engraved characters.

Figure 1C:
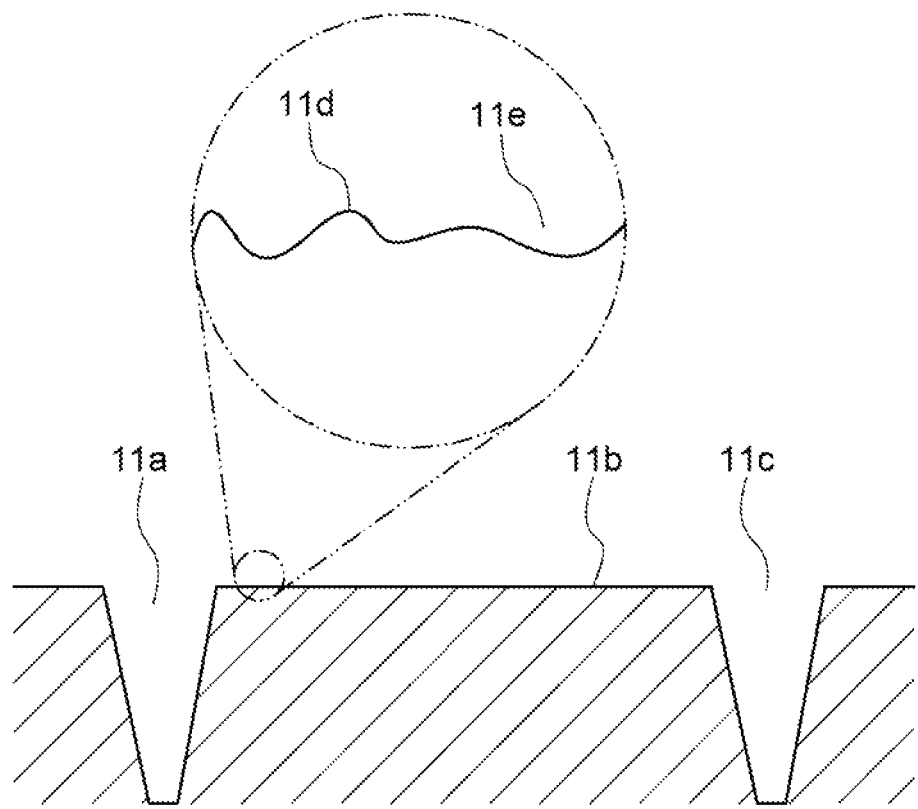
FIG. 1C is a view schematically showing an example of the cross section of the date mark.

FIG. 1C schematically shows an example of the cross section of the date mark 11. As shown in FIG. 1C, irregularities 11a, 11b and 11c corresponding to the groove portions of the engraved character exist on the surface of the date mark 11. Moreover, microlevel fine irregularities 11d and 11e are randomly formed on each of the irregularities 11a, 11b and 11c and the remaining surface of the date mark. Such fine irregularities 11d and 11e are at a level that does not affect the performance or quality of the product, and are usually treated as the same product. However, in reality, patterns of fine irregularities are never the same even for a plurality of products with the same date mark 11, and an individual difference is made. In this example embodiment, such an individual difference in pattern of fine irregularity of the date mark 11 is used for authentication and matching. Therefore, even if the date marks 11 of the plurality of products 10 display the same content, it is possible to identify the individual products 10.

Further, on the product 10 manufactured using a mold, as shown in FIG. 1A, a mark other than the date mark 11, such as a logo 12 showing a manufacturing company and a logo 13 showing some symbol or the like, may be formed during the process of manufacturing. Then, product-specific fine irregularities are also formed on the logos 12 and 13. However, the inventor has come to employ the date mark 11 from the viewpoint of ease of determining an image capture condition and an image processing condition. This point will be described below.

Figure 1D:
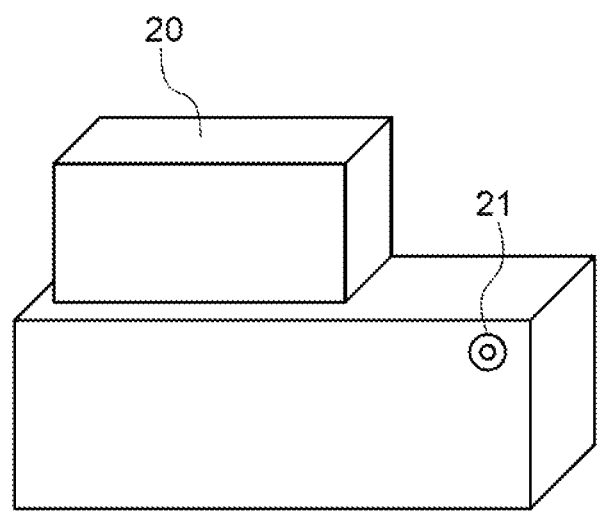
FIG. 1D is an external perspective view showing another example of a product with a date mark.

In order to capture an image of a target object having fine irregularities formed on its material with good contrast, it is necessary to capture an image under an image capture condition in which parameters such as an illumination angle and image resolution are appropriately set. Moreover, in order to extract a feature value related to a pattern of the fine irregularities from the image, it is necessary to extract a feature value under an image processing condition in which parameters for preprocessing and feature extraction are appropriately set. Favorable image capture conditions and image processing conditions cannot be correctly determined unless the three-dimensional shape of the target object is settled. Therefore, in the case of using an individual difference in fine irregularities on the other marks such as the logos 12 and 13, it is impossible to determine which portion of fine irregularities should be used for individual identification unless products are actually completed, and hence, it is impossible to determine the image capture conditions and the image processing conditions in advance. On the other hand, in the case of using an individual difference in pattern of fine irregularities on the date mark for individual identification, even if a product is not actually completed, it is possible to determine the image capture conditions and the image processing conditions in advance if there is another product with the same date mark or a prototype. For example, as shown in FIG. 1D, for a product 20 with a date mark 21 formed using a mold date mark having the same specifications as the date mark 11 of the product 10, it is possible to set the same image capture conditions and image processing conditions as those for the product 10, although the appearance and function of the product 20 are completely different from those of the product 10 shown in FIG. 1A. Since there are many cases where mold date marks of the same specifications are used for different product molds, there is a great merit if image capture conditions and image processing conditions can be shared between different products. Moreover, even for a new product whose product mold has not been completed, there is a merit that image capture conditions and image processing conditions can be determined in advance if a mold date mark to be used is determined.

In this example embodiment, the values of an image capture parameter and an image processing parameter are determined in advance for each of the mold date marks of the same specifications, and the determined values are associated with a model number that uniquely identifies the specification of the mold date mark and stored into a storage device. Moreover, in this example embodiment, at the time of individual registration and individual matching of a product, an image capture parameter and an image processing parameter associated with the model number of a mold date mark used for forming a date mark of the registration target and matching target product are acquired from the storage device. Moreover, in this example embodiment, an image capture condition and an image processing condition determined by the values of the acquired image capture parameter and the image processing parameter are set, an image of the date mark is captured under the image capture condition, image processing is performed under the image processing condition, and a feature value is extracted from the image of the date mark.

The above is the overview of this example embodiment. Subsequently, this example embodiment will be described in detail.

First, an image capture parameter and an image processing parameter will be described.

<Image Capture Parameter>

An example of an image capture parameter is an illumination angle. An illumination angle is an angle at which illumination light enters the surface of an object.

Another example of an image capture parameter is image resolution. For example, image resolution is represented by DPI (Dot Per Inch). Since there is a certain causal relation between image resolution and image capture magnification, image capture magnification may be used as an image capture parameter instead of image resolution.

An image capture parameter is not limited to an illumination angle and image resolution described above. Other examples of an image capture parameter are the distance between a target object and a camera, the intensity of illumination light, the wavelength of illumination light, the size of a light, the type of a light, the location of a light, lens magnification, or the like.

<Image Processing Parameter>

An image processing parameter is classified roughly into a preprocessing parameter and a feature extraction parameter.

A preprocessing parameter is a parameter used in preprocessing executed before feature extraction on a date mark image. A feature extraction parameter is a parameter used in a feature extraction process executed on a date mark image after execution of preprocessing.

First, the overview of preprocessing will be described, and some parameters used in preprocessing will be described.

FIG. 2 is a view showing the overview of preprocessing executed on a date mark image. In preprocessing, three processes of masking, noise elimination, and sharpening are executed on a captured image in this order.

In the masking process, the region of a captured image is divided into a date mark region and the remaining region (background), and pixels belonging to the background are replaced with a specific pixel value. There are two methods for determining a specific pixel value. One method is replacing the pixels with a previously given pixel value (generally zero). The other method is determining, for each of the background pixels to be replaced, the value of the pixel after replacement based on the values of the pixel and its peripheral pixels. The range of peripheral pixels is determined by a previously given local image block. For example, in a case where a 3×3 block is used as a local image block, a pixel value after replacement is determined by, for example, the average value of nine pixels including a target pixel and eight pixels thereabound. The specific pixel value such as zero and the local image block are called masking process parameters. A masking process parameter is an example of a preprocessing parameter.

In noise elimination, noise that exists in the date mark region in the captured image after the masking process is eliminated by, for example, a median filter. Alternatively, the noise is eliminated by a smoothing filter. Alternatively, noise (sensor noise) is eliminated by a bilateral filter. The median filter, the smoothing filter, and the bilateral filter are referred to as noise elimination parameters. A noise elimination parameter is another example of a preprocessing parameter.

In sharpening, the contrast of a captured image is optimized for each local region to emphasize a pattern with individual identification. For example, the captured image after the noise elimination is divided into local regions of a previously given image block size, and CLAHE (Contrast Limited Adaptive Histogram) is applied to each local region. The image block size is called a sharpening process parameter. A sharpening process parameter is still another example of a preprocessing parameter.

<Feature Extraction Parameter>

Next, the overview of a feature extraction process will be described, and some parameters used in the feature extraction process will be described.

FIG. 3 is a view showing the overview of the feature extraction process. In the feature extraction process shown in FIG. 3, four processes including window function application, frequency transformation process, frequency band selection, and weighting on each feature value element are performed in this order on the captured image after application of the preprocessing.

A window function is applied in order to suppress noise mixing into a feature value due to the discontinuity of the image edge in frequency transformation in a subsequent stage. In the window function application, a window function having a shape that can leave a pattern with individual identification in the captured image as much as possible (for example, a generalized humming window function) is used. A parameter that regulates the shape of the window function is called a window function application parameter. A window function application parameter is an example of a feature extraction parameter.

A frequency transformation process is, for example, Fourier transform.

In frequency band selection, a frequency band element with individual identification is selected from a two-dimensional data array (complex number) which is the data after the frequency transformation in accordance with the size and the center position coordinates of a previously given array block. The size and the center position coordinates of the array block are called frequency band selection parameters. The frequency band selection parameter is another example of the feature extraction parameter.

Weighting on each feature value element is performed by, for example, multiplying each element of the frequency band selected in the frequency band selection by a two-dimensional Gaussian function. A parameter that determines the shape of the two-dimensional Gaussian function in each of the two dimensions is called a weight parameter for each feature value element.

This weight parameter is still another example of the feature extraction parameter.

Subsequently, the configuration of an individual identification apparatus according to this example embodiment will be described.

Figure 4:
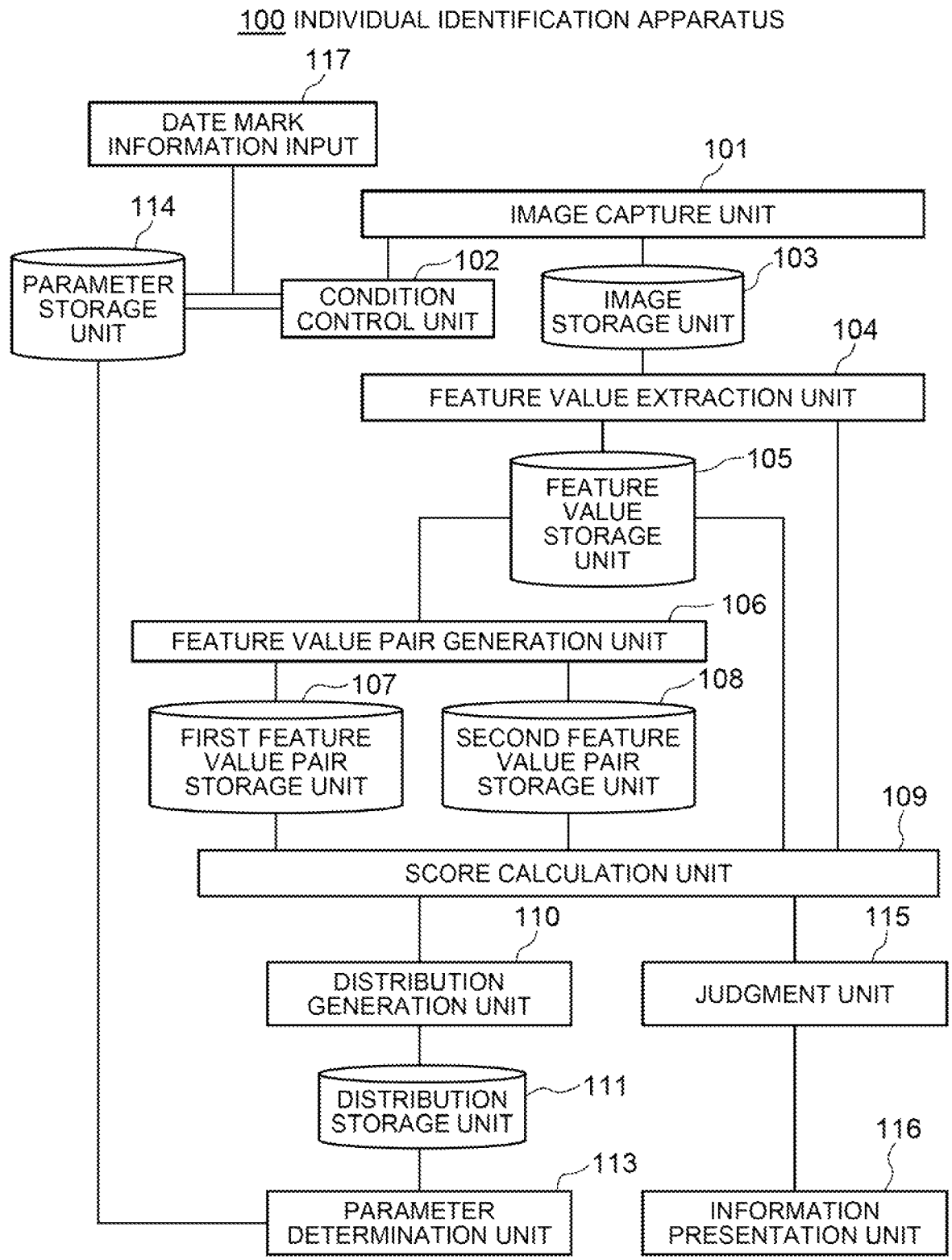
FIG. 4 is a block diagram of an individual identification apparatus according to the first example embodiment of the present invention.

FIG. 4 is a block diagram of the individual identification apparatus according to this example embodiment. An individual identification apparatus 100 according to this example embodiment includes an image capture unit 101, a condition control unit 102, an image storage unit 103, a feature value extraction unit 104, a feature value storage unit 105, a feature value pair generation unit 106, a first feature value pair storage unit 107, a second feature value pair storage unit 108, a score calculation unit 109, a distribution generation unit 110, a distribution storage unit 111, a parameter determination unit 113, a parameter storage unit 114, a judgment unit 115, an information presentation unit 116, and a date mark information input unit 117.

The date mark information input unit 117 is configured to input information which uniquely determines the specification of a date mark. In this example embodiment, the model number of a date mark is used as information which uniquely determines the specification of a date mark. In a case where the model numbers of mold date marks are identical, the three-dimensional shapes of date marks formed by the mold date marks are identical. However, date mark information is not limited to the model number of a mold date mark.

The condition control unit 102 is configured to control the condition of image capture by the image capture unit 101. The condition control unit 102 controls an image capture condition by combination of the values of predetermined one or more kinds of image capture parameters. In this example embodiment, three kinds including an illumination angle, image resolution, and the relative posture between a date mark on a product and a camera are used as predetermined image capture parameters. Two of these parameters, that is, an illumination angle and image resolution are image capture parameters that are determined in advance. The relative posture between a date mark and a camera is used as a disturbance factor, not as an image capture parameter that is determined in advance. However, the kind and number of an image capture parameter determined in advance are not limited to the above. Moreover, the kind and number of an image capture parameter used as a disturbance factor are not limited to the above.

Further, the condition control unit 102 is configured to control the condition of image processing by the feature value extraction unit 104. The condition control unit 102 controls an image processing condition by combination of the values of predetermined one or more kinds of image processing parameters. In this example embodiment, two kinds including a preprocessing parameter set and a feature extraction parameter set are used as predetermined image processing parameters. A preprocessing parameter set includes one or two or more parameters belonging to the abovementioned masking process parameter, noise elimination parameter, and sharpening process parameter. A feature extraction parameter set includes one or two or more parameters belonging to the abovementioned window function application parameter, frequency band selection parameter, and weight parameter.

The image capture unit 101 is configured to capture an image of the date mark of a product with a camera based on the image capture condition set by the condition control unit 102.

Figure 5A:
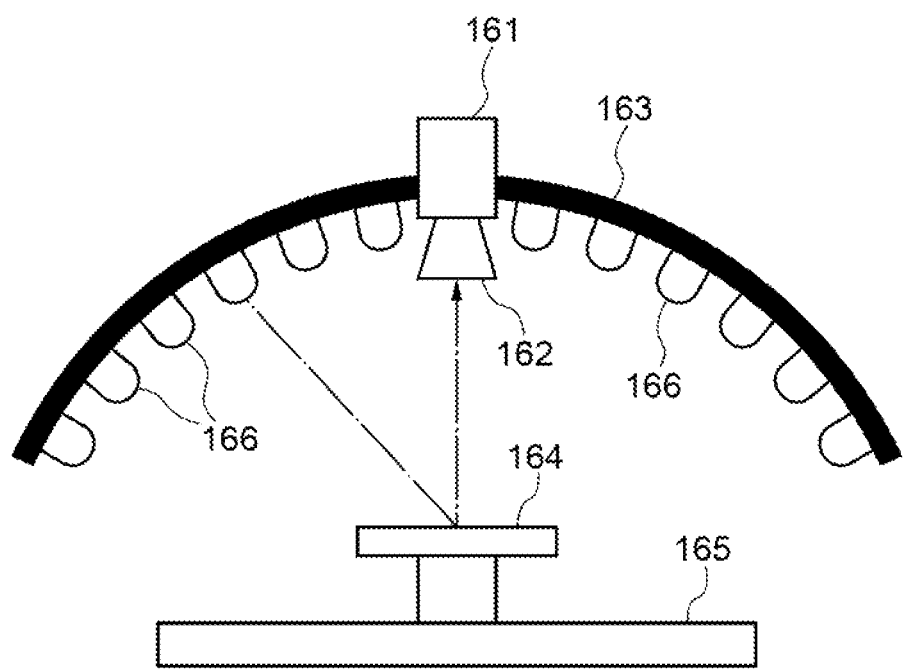
FIG. 5A is a cross-section view showing an example of the structure of an image capture unit of the individual identification apparatus according to the first example embodiment of the present invention.
Figure 5B:
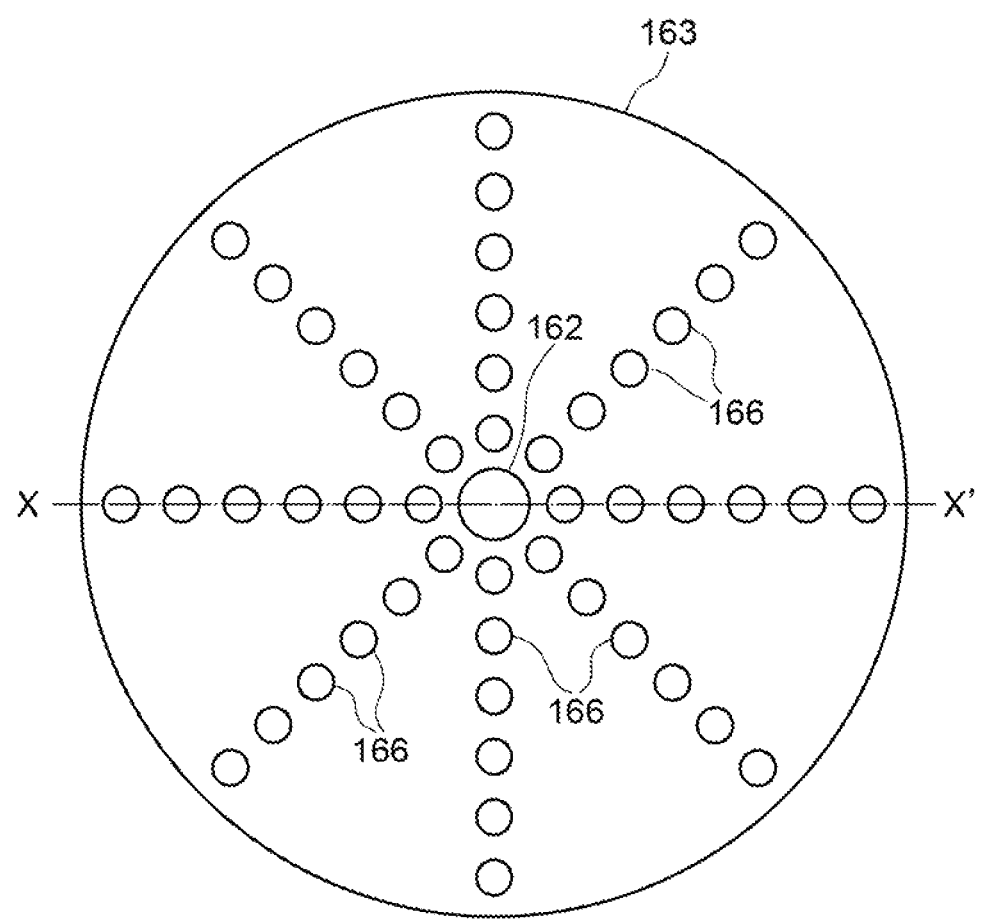
FIG. 5B is a top view showing the example of the structure of the image capture unit of the individual identification apparatus according to the first example embodiment of the present invention.

FIGS. 5A and 5B show an example of the structure of the image capture unit 101. FIG. 5A is a cross-section view taken along line X-X, and FIG. 5B is a top view. The image capture unit 101 of this example includes a camera 161 having a zoom lens 162. The camera 161 may be, for example, a digital camera. The optical axis of the camera 161 is a direction perpendicular to the material surface of the date mark of a product 164. The product 164 is placed on a table 165. By tilting or rotating the table 165, the posture of the product 164 with respect to the camera 161 and thus the posture of the date mark can be changed. The distance between the camera 161 and the date mark of the product 164 is almost constant. The image resolution can be controlled by changing an image capture magnification with the zoom lens 162. Moreover, the image capture unit 101 includes an illuminator 163 whose illumination angle is variable. The illuminator 163 includes illumination units 166 such as LEDs arranged in different positions in the latitude direction (height direction), which are arranged in eight directions in the longitude direction (circumferential direction). The illumination angle can be controlled by changing the position of the illumination unit 166 to be turned on.

The image storage unit 103 is configured for storing an image of a date mark of a product captured by the image capture unit 101.

The feature value extraction unit 104 is configured to perform image processing on an image of a date mark of a product stored in the image storage unit 103 based on the image processing condition set by the condition control unit 102. First, the feature value extraction unit 104 performs the preprocessing described with reference to FIG. 2 on the image of the date mark. Next, the feature value extraction unit 104 performs the feature extraction process described with reference to FIG. 3.

The feature value storage unit 105 is configured for storing a feature value extracted by the feature value extraction unit 104.

The feature value pair generation unit 106 is configured to generate a first feature value pair for each product from the feature values of a plurality of date marks of a plurality of products stored in the feature value storage unit 105. A first feature value pair refers to a pair of feature values extracted from a plurality of date mark images of products that two feature values forming the pair are identical. Moreover, the feature value pair generation unit 106 is configured to generate a second feature value pair for all combinations of products from the feature values of the plurality of date marks of the plurality of products stored in the feature value storage unit 105. A second feature value pair refers to a pair of feature values extracted from a plurality of date mark images of products that two feature values forming the pair are different from each other.

The first feature value pair storage unit 107 is configured for storing a plurality of first feature value pairs generated by the feature value pair generation unit 106. The second feature value pair storage unit 108 is configured for storing a plurality of second feature value pairs generated by the feature value pair generation unit 106.

The score calculation unit 109 is configured to calculate the correlation between two feature values and calculate a matching score representing the degree of similarity of the two feature values. The pair of two feature values for which the score is calculated is the first feature value pair, the second feature value pair, and a pair formed by an identification/matching target feature value extracted by the feature value extraction unit 104 and a reference feature value stored in the feature value storage unit 105. The score calculation unit 109 calculates the score by using, for example, the number of corresponding feature value elements between both the feature values. Alternatively, the score calculation unit 109 calculates the score based on, for example, the Hamming distance between codes representing both the feature values. The score may be a value that increases as the two feature values are more similar, that is, as the distance between the two feature values is smaller, or may be a value that decreases on the contrary. However, the score calculation method is not limited to the above example.

The distribution generation unit 110 is configured to generate a first distribution that is the distribution of the matching scores of a plurality of first feature value pairs. The distribution generation unit 110 is also configured to generate a second distribution that is the distribution of the matching scores of a plurality of second feature value pairs. Herein, the first distribution and the second distribution are information expressing, in tabular format or graph format, the number of first feature value pairs and the number of second feature value pairs appearing in each of sections obtained by dividing the range of the scores into several sections.

The distribution storage unit 111 is configured for storing the first distribution and the second distribution generated by the distribution generation unit 110.

The parameter determination unit 113 is configured to calculate the separation degree between the first distribution and the second distribution stored in the distribution storage unit 111. Moreover, the parameter determination unit 113 is configured to determine the values of image capture parameters and image processing parameters determined in advance based on the calculated separation degree.

The parameter storage unit 114 is configured for storing the values of the image capture parameters and the image processing parameters determined by the parameter determination unit 113 in a manner that the values are associated with the date mark information.

The judgment unit 115 is configured to generate the result of judgment of identification and matching based on the score calculated by the score calculation unit 109 for the pair formed by the identification/matching target feature value extracted by the feature value extraction unit 104 and the reference feature value stored in the feature value storage unit 105.

The information presentation unit 116 is configured to present product management information based on the result of the judgment by the judgment unit 115.

Figure 6:
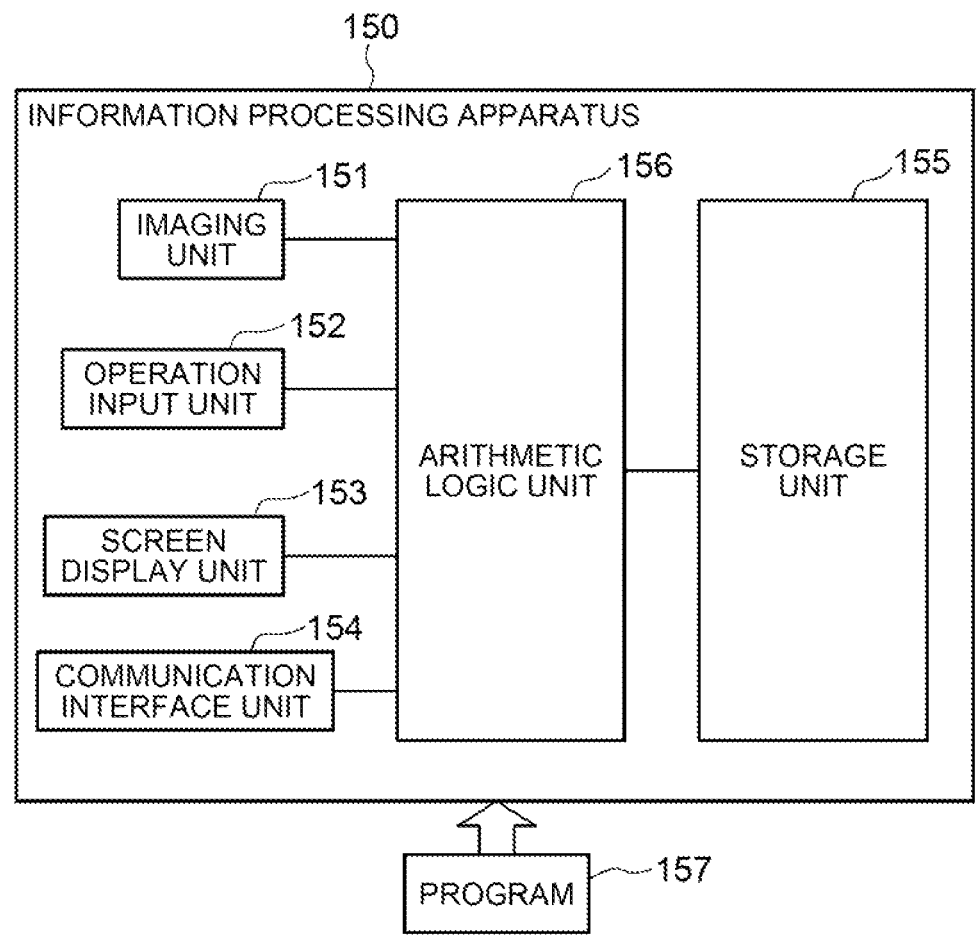
FIG. 6 is a block diagram showing an example of the hardware of the individual identification apparatus according to the first example embodiment of the present invention.

The individual identification apparatus 100 can be realized by, for example, as shown in FIG. 6, an information processing apparatus 150 such as a personal computer and a program 157. The information processing apparatus 150 includes an imaging unit 151 such as a camera, an operation input unit 152 such as a keyboard and a mouse, a screen display unit 153 such as a liquid crystal display, a communication interface unit 154, a storage unit 155 such as a memory and a hard disk, and an arithmetic logic unit 156 such as one or more microprocessors.

The program 157 is loaded into the memory from an external computer-readable storage medium at the time of, for example, start-up of the image processing apparatus 150, and controls the operation of the arithmetic logic unit 156 and thereby realizes, on the arithmetic logic unit 156, functional units such as the image capture unit 101, the condition control unit 102, the image storage unit 103, the feature value extraction unit 104, the feature value storage unit 105, the feature value pair generation unit 106, the first feature value pair storage unit 107, the second feature value pair storage unit 108, the score calculation unit 109, the distribution generation unit 110, the distribution storage unit 111, the parameter determination unit 113, the parameter storage unit 114, the judgment unit 115, the information presentation unit 116, and the date mark information input unit 117.

Next, an operation of the individual identification apparatus 100 according to this example embodiment will be described. The operation of the individual identification apparatus 100 is classified roughly into the following three:
(a) preprocessing operation to determine the values of specific image capture parameters and image processing parameters;
(b) individual registration operation; and
(c) individual identification and individual matching operation

[Preprocessing Operation to Determine Values of Specific Image Capture Parameters and Image Processing Parameters]

In this example embodiment, the values of two image capture parameters, that is, an illumination angle and image resolution are determined in advance. Moreover, in this example embodiment, a preprocessing parameter set and a feature extraction parameter set, which are predetermined as specific image processing parameters, are determined in advance. The preprocessing parameter set includes at least one preprocessing parameter. The feature extraction parameter set includes at least one feature extraction parameter.

The processing for determining the values of the specific image capture parameters and image processing parameters is executed for each of the model numbers of mold date marks.

Figure 7:
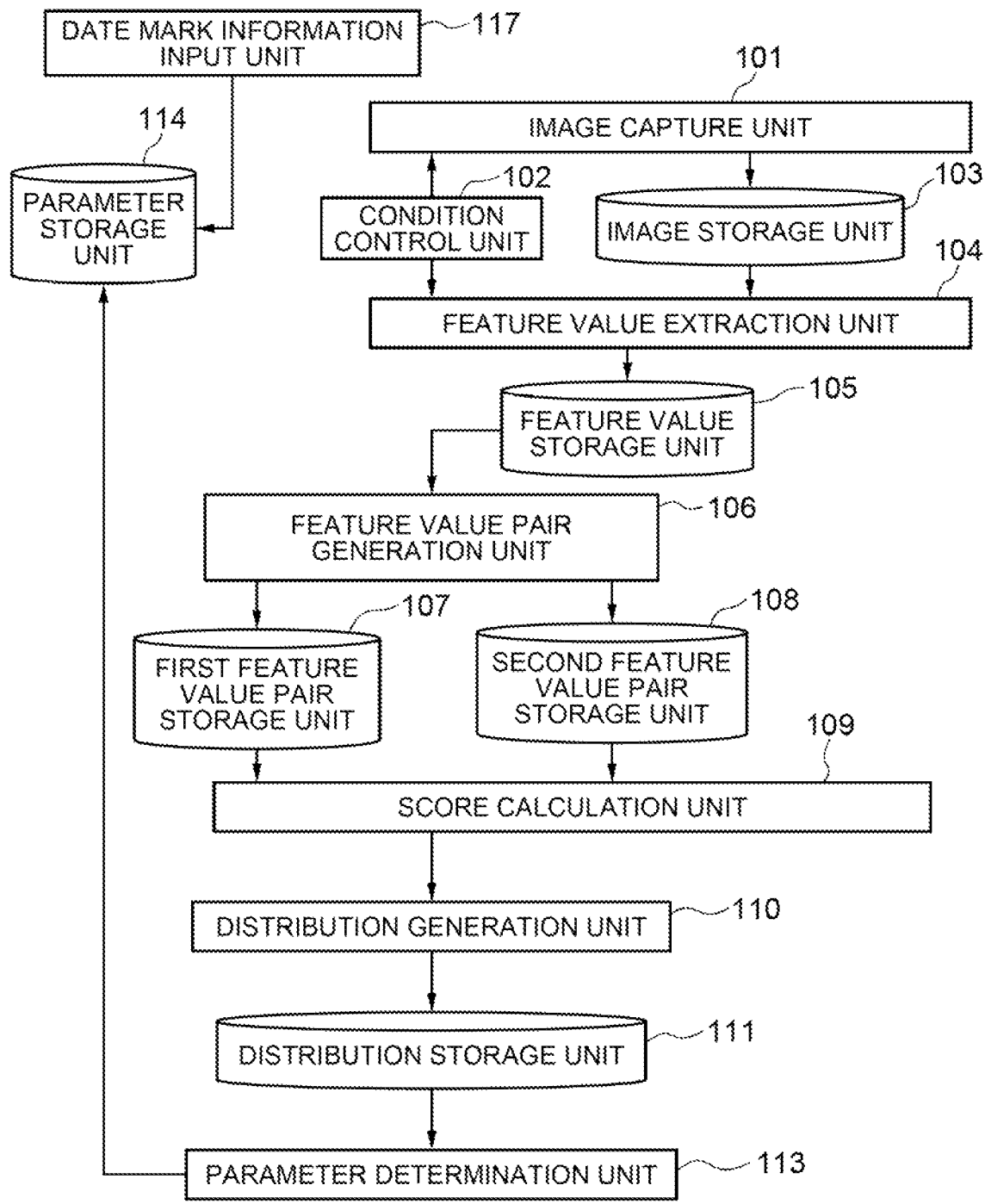
FIG. 7 is an operation flow showing an example of a process of determining the values of specific image capture parameter and image processing parameter in the individual identification apparatus according to the first example embodiment of the present invention.
Figure 8:
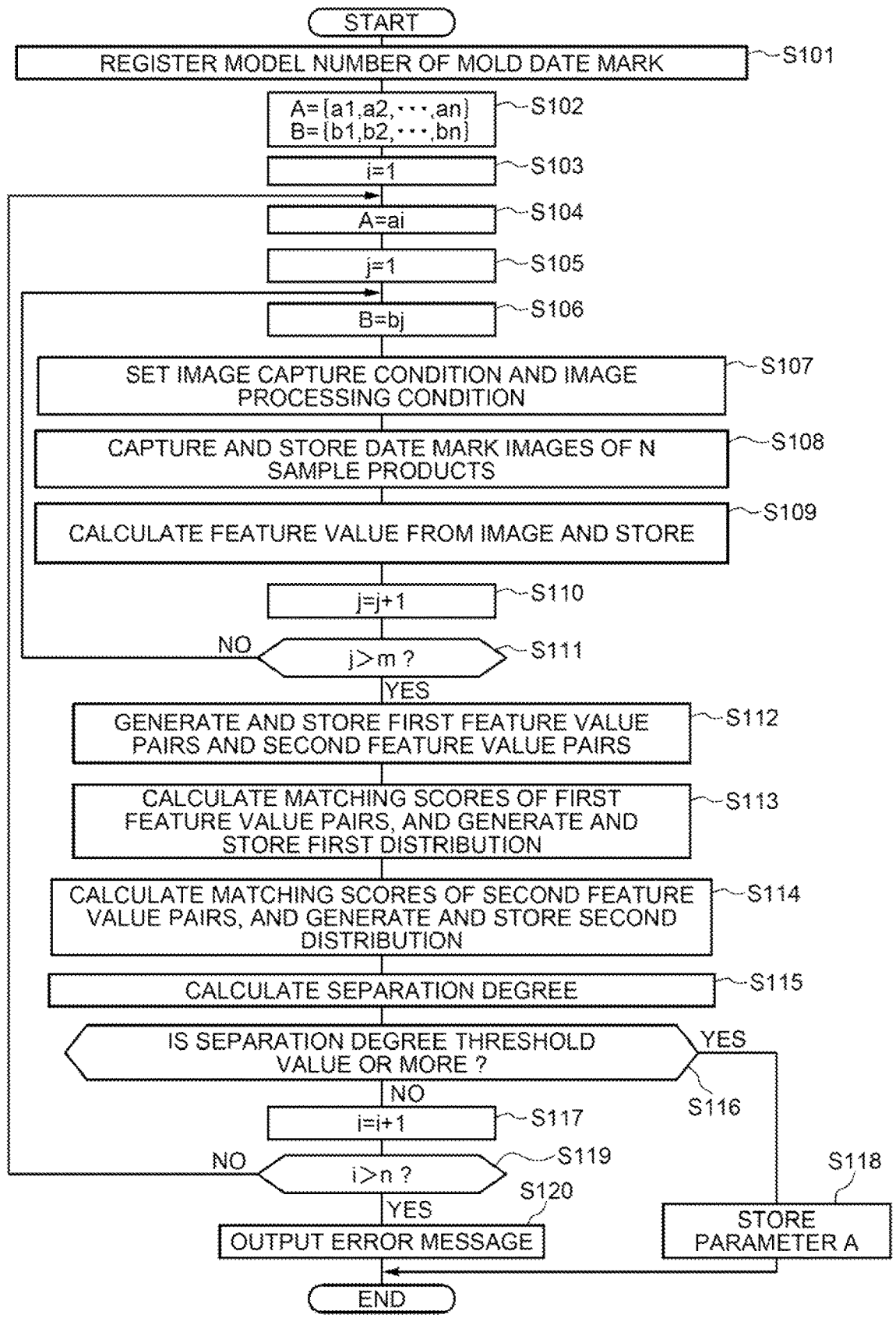
FIG. 8 is a flowchart showing the example of the process of determining the values of specific image capture parameter and image processing parameter in the individual identification apparatus according to the first example embodiment of the present invention.

FIG. 7 is an operation flow showing an example of the processing for determining the values of the specific image capture parameters and image processing parameters executed for each of the model numbers of mold date marks. Moreover, FIG. 8 is a flowchart showing an example of the process of determining the values of the specific image capture parameters and image processing parameters executed for each of the model numbers of mold date marks.

First, an operator who manages the preprocessing registers the model number of a mold date mark to be processed into the parameter storage unit 114 through the date mark information input unit 117 (step S101).

FIG. 9 shows an example of the content of the parameter storage unit 114. Referring to FIG. 9, in the parameter storage unit 114, parameters determined by the parameter determining unit 113 are stored so as to be associated with the model number of a mold date mark. The parameters are classified roughly into image capture parameters and image processing parameters. The image capture parameters include two parameters, that is, an illumination angle and image resolution. The image processing parameters include two parameter sets, that is, a preprocessing parameter set and a feature extraction parameter set. At a moment when the operator inputs, the values of the illumination angle, image resolution, preprocessing parameter set, and image processing parameter set are defaults. The defaults are updated by values determined by the parameter determination unit 113.

Next, the condition control unit 102 sets the predetermined image capture parameters (in this example, an illumination angle and image resolution) and the predetermined image processing parameters (in this example, a preprocessing parameter set and a feature extraction parameter set) as the parameter set A, sets the predetermined image capture parameter used as a disturbance factor (in this example, the relative posture between a product and a camera) as the parameter set B, and comprehensively generates candidates for the values of the parameter set A and the candidates for the values of the parameter set B (step S102). For example, the condition control unit 102 comprehensively generates candidates for the values of the parameter set A, each of which includes the values of the predetermined illumination angle, image resolution, preprocessing parameter set and feature extraction parameter set and in each of which the value of at least one parameter is different from the values of the other candidates. Moreover, the condition control unit 102 generates the relative posture between a product and a camera as a candidate for the value of the parameter set B.

FIG. 10 shows an example of candidates for the values of the parameter set A. In this example, the condition control unit 102 generates candidates a1 to an for the values of the parameter set A in a×b×c×d ways by changing the illumination angle from θ1 to θa in a ways, changing the image resolution from m1 to mb in b ways, changing the preprocessing parameter set from pr1 to prc in c ways, and changing the feature extraction parameter set from eq1 to eqd in d ways.

FIG. 11 shows an example of candidates for the value of the parameter set B. In this example, the condition control unit 102 generates candidates b1 to bm for the value of the parameter set B in m ways by changing the posture of a product at the time of image capture in m ways.

Next, the condition control unit 102 sets a variable i for selecting a candidate for the values of the parameter set A to 1 (step S103), and selects a candidate a1 for the values of the parameter set A (step S104). Next, the condition control unit 102 sets a variable j for selecting a candidate for the values of the parameter set B to 1 (step S105), and selects a candidate b1 as the parameter set B (step S106). Next, the condition control unit 102 sets an image capture condition (illumination angle, image resolution, and posture) determined by the selected candidate a1 and candidate b1 in the image capture unit 101, and also sets an image processing condition (preprocessing parameter set and feature extraction parameter set) determined by the selected candidate a1 in the feature value extraction unit 104 (step S107). The setting of the image capture condition in the image capture unit 101 may be automated, or may be set manually by the user in a state where the image capture parameter is displayed on the screen display unit 153. The setting of image processing condition in the feature value extraction unit 104 may be automated, or may be set manually by the user in a state where the image processing parameter is displayed on the screen display unit 153.

Next, the image capture unit 101 captures date mark images of N (≥2, preferably ≥3) product samples having date marks manufactured using a mold date mark having a model number 1 at least one time, respectively, and stores the images into the image storage unit 103 (step S108). The product sample having the date mark to be captured may be a finished product manufactured by using the product mold incorporating the mold date mark having the model number 1, or may be a prototype of only a date mark portion. With the above operation, N images G111, G211, . . . , GN11, for example, shown in FIG. 12 are stored in the image storage unit 103 so as to be associated with the IDs of the product samples and the image capture/image processing conditions determined by the candidates a1 and b1.

Next, the feature value extraction unit 104 retrieves the date mark images of the N product samples obtained by capturing under the image capture/image processing conditions determined by the candidates a1 and b1 from the image storage unit 103, extracts feature values from the respective date mark images based on the image processing conditions determined by the candidate a1, and stores the feature values into the feature value storage unit 105. With this, N feature values V111, V211, . . . , VN11, for example, shown in FIG. 13 are stored so as to be associated with the IDs of the product samples and the image capture/image processing conditions determined by the candidates a1 and b1 in the feature value storage unit 105.

Next, the condition control unit 102 increments the variable j (step S110) and, if the variable j is not larger than m, returns to step S106 to repeat the same process as the abovementioned process. With this, date mark images of the same N product samples as described above are captured under image capture/image processing conditions determined by the candidates a1 and b2, and feature values are extracted from the respective date mark images. The same operation is repeated until the variable j becomes larger than m (step S111). With this, while changing the value of the parameter set B in order of b1, b2, . . . , bm in a state where the value of the parameter set A is fixed to a1, images of the date marks of the N product samples are captured a plurality of times, respectively, and feature values are extracted from the respective date mark images. The images G111, G211, . . . , GN11, G112, G212, . . . , GN12, . . . , G11$m$, G21$m$, . . . , GN1$m$ shown in FIG. 12, and the feature values V111, V211, . . . , VN11, V112, V212, . . . , VN12, V11$m$, V21$m$, . . . , VN1$m$ shown in FIG. 13 are images and feature values obtained by capturing in this manner.

Next, the feature value pair generation unit 106 retrieves the feature values V111, V211, . . . , VN11, V112, V212, . . . , VN12, . . . , V11$m$, V21$m$, . . . , VN1$m$ from the feature value storage unit 105, generates first feature value pairs and second feature value pairs, and stores them into the first feature value pair storage unit 107 and the second feature value pair storage unit 108 (step S112). With this, in the first feature value pair storage unit 107, first feature value pairs, for example, shown in FIG. 14 including a combination of two selected from m feature values (V111, V112, . . . , V11$m$), a combination of two selected from m feature values (V211, V212, . . . , V21$m$), . . . , and a combination of two selected from m feature values (VN11, VN12, . . . , VN1$m$) are stored so as to be associated with the candidate a1 for the parameter set A. In the second feature value pair storage unit 108, second feature values pairs, for example, shown in FIG. 15 including a combination of a feature value V11$x$ ($x$=1, 2, . . . , m) and a feature value V$iyy$ (i≠1, y is any value), a combination of a feature value V21x (x=1, 2, . . . , m) and a feature value Viyy (i≠2, y is any value), . . . , and a combination of a feature value VN1x (x=1, 2, . . . , m) and a feature value Viyy (i≠N, y is any value) are stored so as to be associated with the candidate a1 for the parameter set A.

Next, the score calculation unit 109 retrieves the first feature value pairs associated with the candidate a1 for the parameter set A from the first feature value pair storage unit 107 and calculates the correlation between the feature values forming each pair to calculate a matching score, and the distribution generation unit 110 generates a first distribution from the calculated matching scores of the first feature value pairs and stores the first distribution into the distribution storage unit 111 (step S113). With this, in the distribution storage unit 111, for example, as shown in FIG. 16, a distribution D11 of the first feature value pairs is stored so as to be associated with the candidate a1 for the parameter set A.

Further, the score calculation unit 109 retrieves the second feature value pairs associated with the candidate a1 for the parameter set A from the second feature value pair storage unit 108 and calculates the correlation between the feature values forming each pair to calculate a matching score, and the distribution generation unit 110 generates a second distribution from the calculated matching scores of the second feature value pairs and stores the second distribution into the distribution storage unit 111 (step S114). With this, in the distribution storage unit 111, for example, as shown in FIG. 16, a distribution D12 of the second feature value pairs is stored so as to be associated with the candidate a1 for the parameter set A.

Next, the parameter determination unit 113 retrieves the first distribution D11 and the second distribution D12 from the distribution storage unit 111, calculates the separation degree therebetween, and stores the separation degree into the distribution storage unit 111 (step S115). With this, in the distribution storage unit 111, for example, as shown in FIG. 16, a separation degree SP1 is stored so as to be associated with the candidate a1 for the parameter set A.

The separation degree SP1 of the two distributions is a scale or an index value indicating to what degree the two distributions D11 and D12 are separated. As the separation degree, for example, a scale as illustrated below can be used.

Example 1 of Scale of Separation Degree

Figure 17:
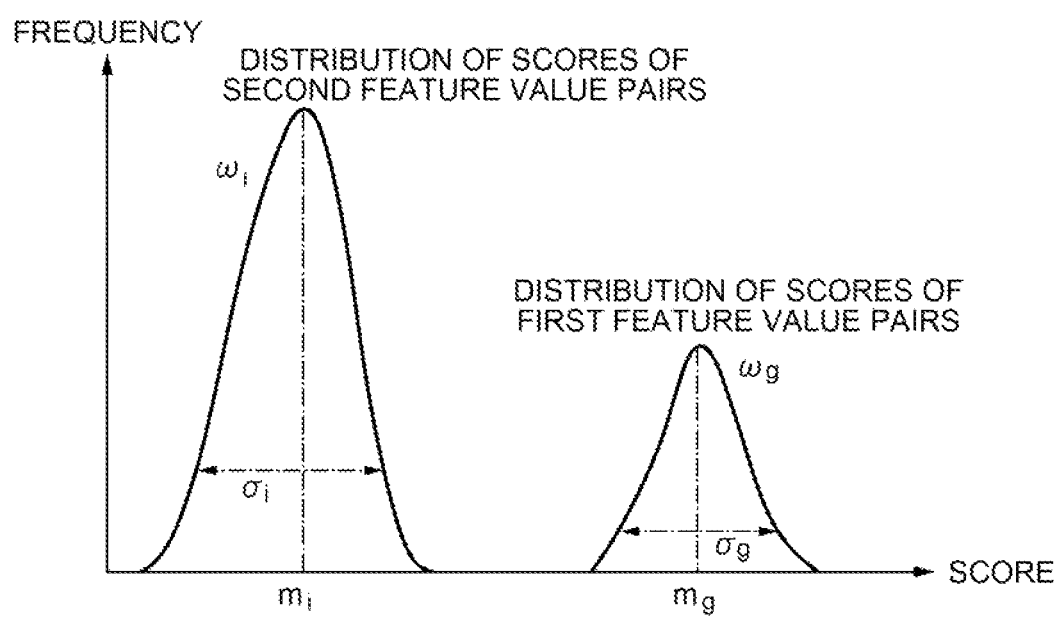
FIG. 17 is a view showing an example of the scale of a separation degree used in the individual identification apparatus according to the first example embodiment of the present invention.

As shown in FIG. 17, when the mean of the distribution of the scores of the first feature value pairs (the first distribution), the variance, and the number of the pairs are $m_g$, $\sigma_g$, and $\omega_g$, and the mean of the distribution of the scores of the second feature value pairs (the second distribution), the variance, and the number of the pairs are $m_i$, $\sigma_i$, and $\omega_i$, an intraclass variance $\sigma_w$ and an interclass variance $\sigma_b$ are given by the following equations, respectively.

$$\sigma_w = (\omega_g \sigma_g^2 + \omega_i \sigma_i^2)/(\omega_g + \omega_i) \quad (1)$$

$$\sigma_b = \omega_g \omega_i (m_g - m_i)^2/(\omega_g + \omega_i)^2 \quad (2)$$

Then, an intraclass variance/interclass variance ratio given by the following equation can be used as the scale of the separation degree.

Separation Degree=intraclass variance/interclass variance ratio=$\sigma_b^2/\sigma_w^2$ (3)

Example 2 of Scale of Separation Degree

Figure 18:
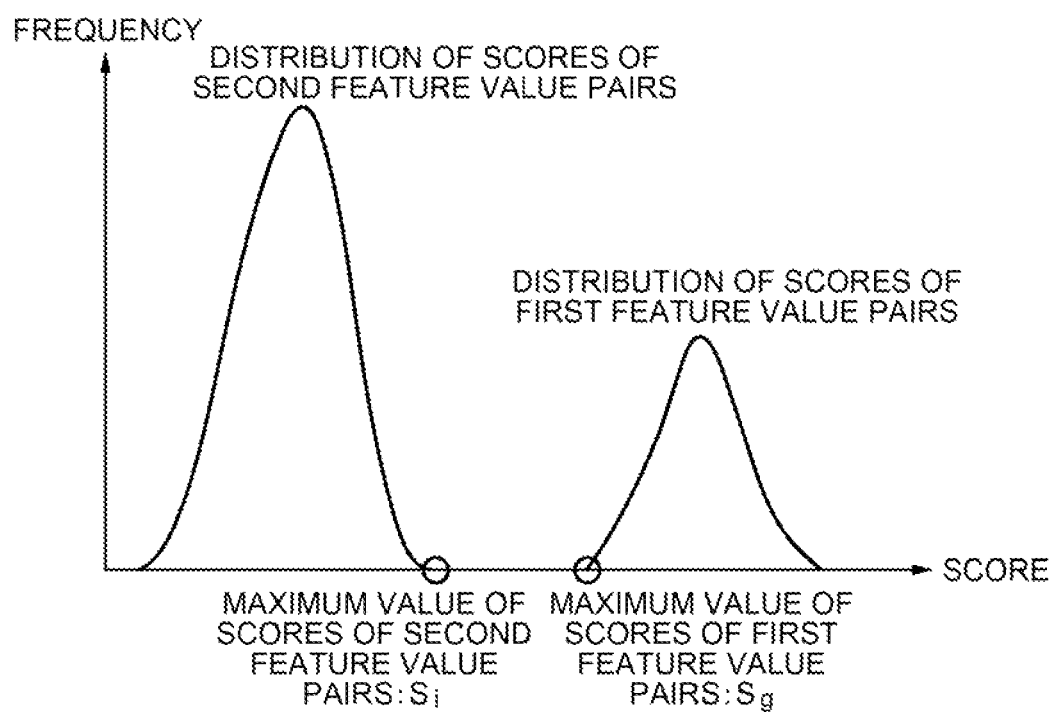
FIG. 18 is a view showing another example of the scale of the separation degree used in the individual identification apparatus according to the first example embodiment of the present invention.

As shown in FIG. 18, when the minimum value of the distribution of the scores of the first feature value pairs (the first distribution) is $S_g$ and the maximum value of the distribution of the scores of the second feature value pairs (the second distribution) is $S_i$, the ratio of the maximum value $S_i$ to the minimum value $S_g$ given by the following equation can be used as the scale of the separation degree.

Separation Degree=ratio of maximum value of second distribution to minimum value of first distribution=$S_i/S_g$ (4)

Example 3 of Scale of Separation Degree

Figure 19A:
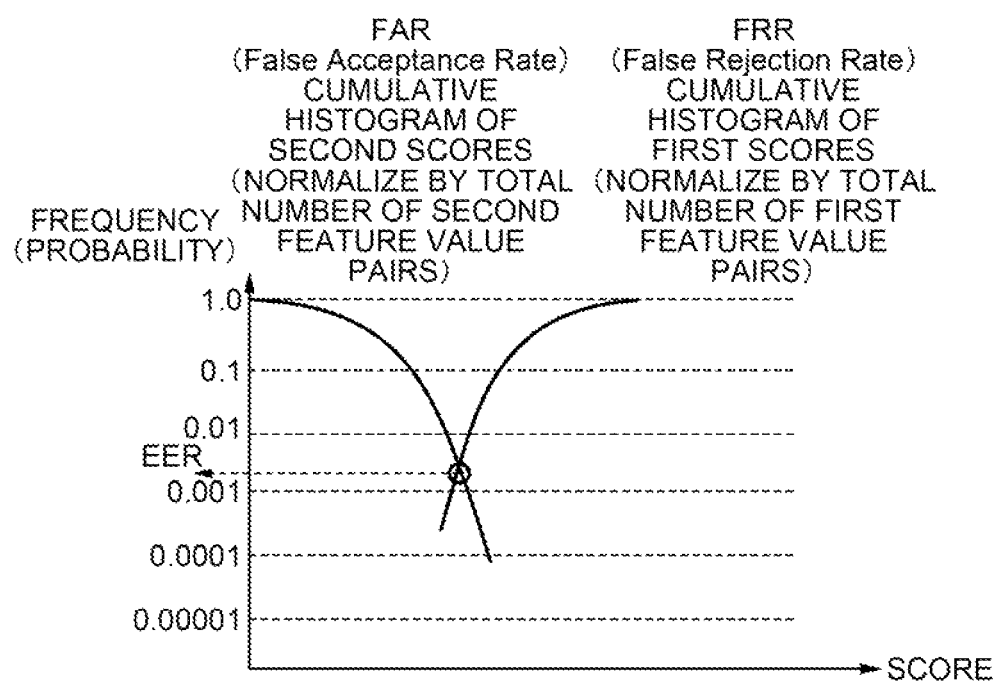
FIG. 19A is a view showing still another example of the scale of the separation degree used in the individual identification apparatus according to the first example embodiment of the present invention.
Figure 19B:
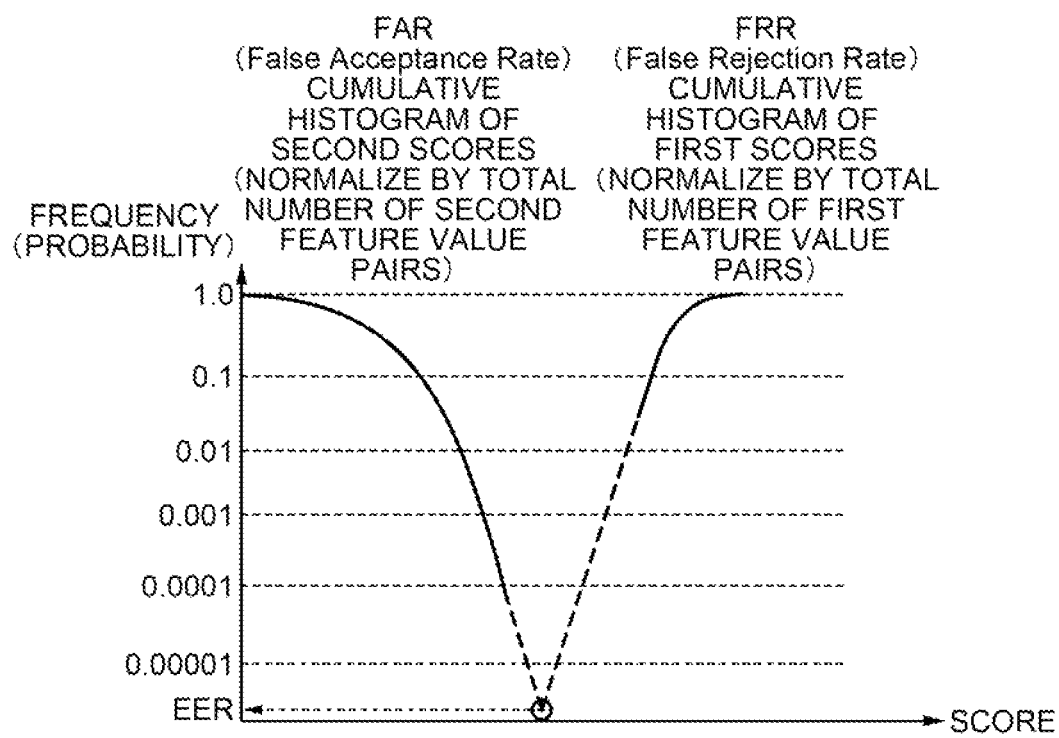
FIG. 19B is a view showing still another example of the scale of the separation degree used in the individual identification apparatus according to the first example embodiment of the present invention.

An EER (Equal Error Rate) at which an FRR (False Rejection Rate) obtained from the distribution of the scores of the first feature value pairs and an FAR (False Acceptance Rate) obtained from the distribution of the scores of the second feature value pairs become equal is set as the scale of the separation degree. For example, as shown in FIG. 19A, the FRR can be obtained as a cumulative histogram of the scores of the first feature value pairs (normalize by the total number of the first feature value pairs). Moreover, as shown in FIG. 19A, the FAR can be obtained as a cumulative histogram of the scores of the second feature value pairs (normalize by the total number of the second feature value pairs). Moreover, as shown in FIG. 19A, the EER can be obtained as the frequency (probability) of the intersection of the FAR and the FRR. Moreover, as shown in FIG. 19B, in a case where the cumulative histogram of the first scores and the histogram of the second scores are completely separated, the EER can be calculated by extrapolation by a cumulative distribution function that approximates each cumulative histogram.

Next, the parameter determination unit 113 compares the calculated separation degree SP1 with a predetermined threshold value, and thereby determines whether or not the first distribution D11 based on the first feature value pairs and the second distribution D12 based on the second feature value pairs are separated by a threshold value or more (step S116). If the separation degree SP1 between the first distribution D11 and the second distribution D12 is equal to or more than the threshold value, the parameter determination unit 113 associates the values of the image capture parameters and the image processing parameters indicated by the candidate a1 for the parameter set A at the time with the model number 1 of the mold date mark and stores into the parameter storage unit 114 (step S118), and ends the process shown in FIG. 8.

On the other hand, if the separation degree SP1 between the first distribution D11 and the second distribution D12 is less the threshold value, the parameter determination unit 113 determines that the N product samples cannot be identified from each other under the image capture conditions and the image processing conditions indicated by the candidate a1 for the parameter set A at the time. Then, the parameter determination unit 113 increments the variable i (step S117), confirms that i is not larger than n (NO at step S119), and returns to step S104. With this, the same process as the process described above is repeated in a state where the value of the parameter set A is fixed to the candidate a2 (steps S104 to S116).

After that, until either a condition that a candidate for the parameter set A that makes the separation degree between the first distribution and the second distribution equal to or more than the threshold value is found or a condition that the variable i becomes larger than n is first established, the process shown in FIG. 8 is executed. In a case where a candidate for the parameter set A that makes the separation degree equal to or more than the threshold value is not found before the variable i becomes larger than n, the parameter determination unit 113 outputs an error message (step S120), and ends the process shown in FIG. 8.

Figure 20:
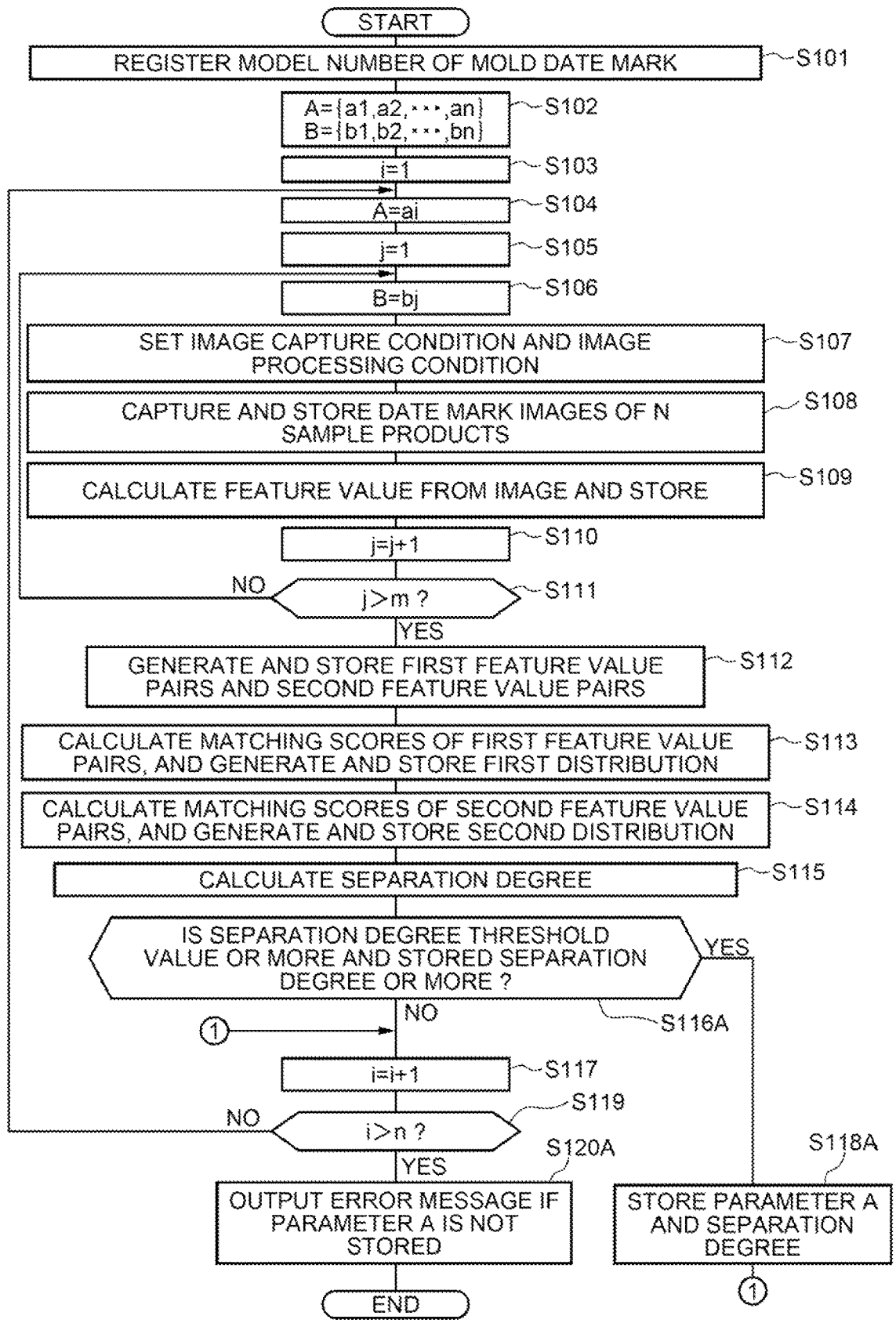
FIG. 20 is a flowchart showing another example of the process of determining the values of specific image capture parameter and image processing parameter in the individual identification apparatus according to the first example embodiment of the present invention.

FIG. 20 is a flowchart showing another example of the process of determining the values of the specific image capture parameters and image processing parameters executed for each mold date mark model number. When compared with the process shown in FIG. 8, the process shown in FIG. 20 is different in that steps S116, S118 and S120 are replaced with steps S116A, S118A and S120A, and otherwise the same as the process shown in FIG. 8.

At step S116A, the parameter determination unit 113 determines whether or not the calculated separation degree is equal to or more than the threshold value and is also equal to or more than a separation degree of a candidate for the parameter set A of the same model number stored in the parameter storage unit 114. If the calculated separation degree is equal to or more than the threshold value and is also equal to or more than the separation degree of the candidate for the parameter set A of the same model number stored in the storage unit storage unit 114, the parameter determination unit 113 overwrites the candidate for the parameter set A of the same model number stored in the parameter storage unit 114 and the separation degree thereof with the current candidate for the parameter set A and the separation degree thereof (step S118A). Then, the parameter determination unit 113 proceeds to step S117. On the other hand, if the calculated separation degree is not equal to or more than the threshold value, or if the calculated separation degree is equal to more than the threshold value but is not equal to or more than the separation degree of the parameter set A of the same model number stored in the parameter storage unit 114, the parameter determination unit 113 skips step S118A and proceeds to step S117.

When the parameter determination unit 113 determines that the variable i is larger than n at step S119, if a candidate for the parameter set A is not stored in the parameter storage unit 114, the parameter determination unit 113 outputs an error message (step S120A), and ends the process of FIG. 20. If a candidate for the parameter set A is stored in the parameter storage unit 114, the stored candidate is a candidate for the parameter set A giving a separation degree that is equal to or more than the threshold value and is the maximum, that is, the values of the image capture parameters and the image processing parameters determined in advance.

[Individual Registration Operation]

Next, an individual registration operation to register individual products to be managed will be described.

Figure 21:
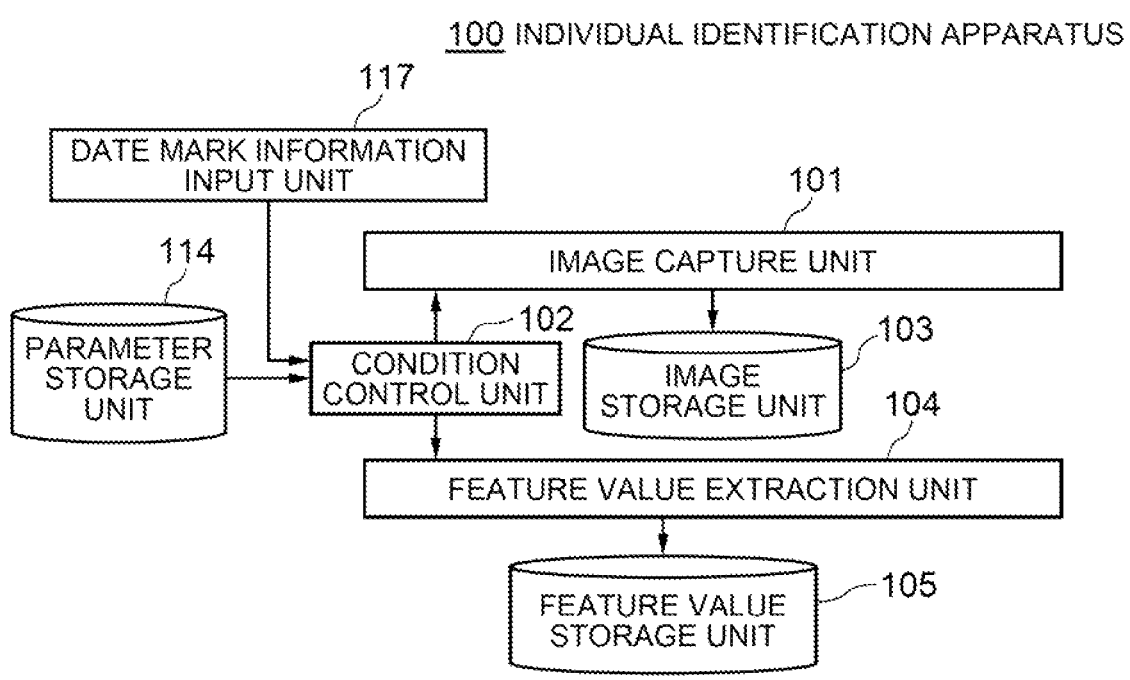
FIG. 21 is an operation flow showing an example of individual registration in the individual identification apparatus according to the first example embodiment of the present invention.
Figure 22:
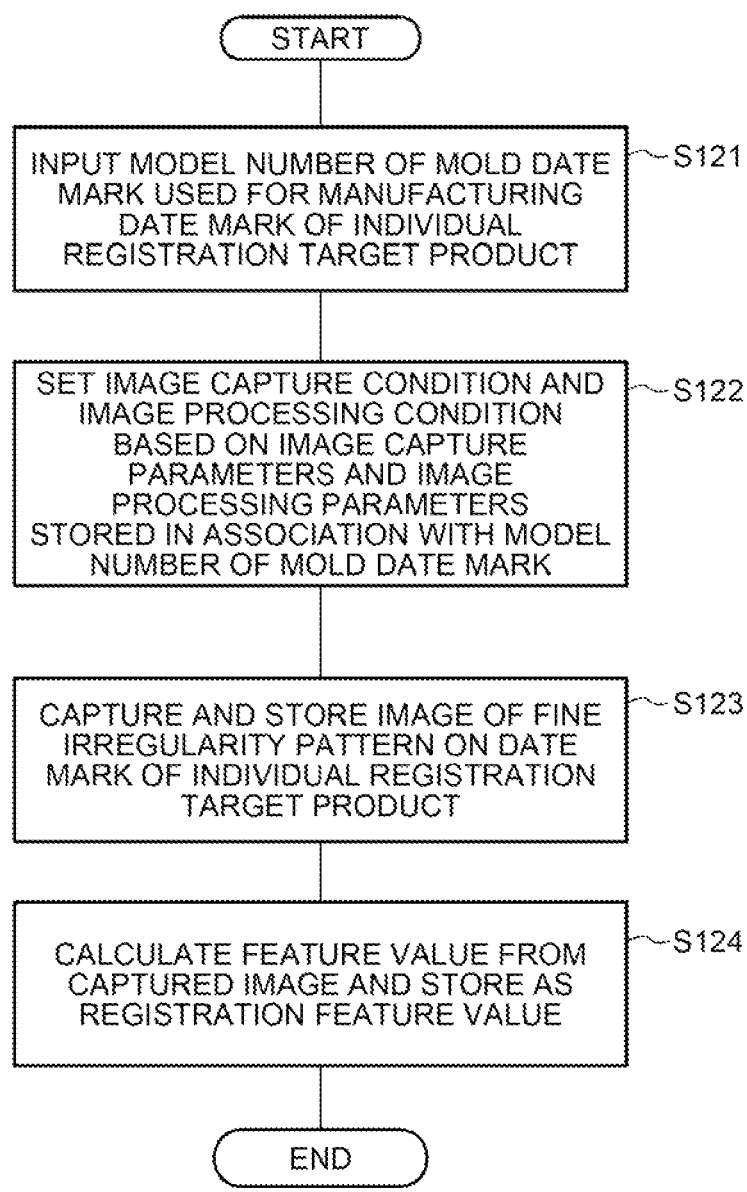
FIG. 22 is a flowchart showing an example of individual registration in the individual identification apparatus according to the first example embodiment of the present invention.

FIGS. 21 and 22 are a processing flow and a flowchart of the individual registration operation. First, an operator who manages individual registration inputs the model number of a mold date mark used for forming a date mark of a product to be registered into the condition control unit 102 through the date mark information input unit 117 (step S121).

The condition control unit 102 retrieves the values of image capture parameters and image processing parameters corresponding to the model number of the mold date mark input through the date mark information input unit 117 from the parameter storage unit 114, sets an image capture condition determined by the values of the image capture parameters in the image capture unit 101, and also sets an image processing condition determined by the values of the image processing parameters in the feature value extraction unit 104 (step S122). For example, in a case where the model number 1 is input, the condition control unit 102 sets an illumination angle and image resolution stored in association with the model number 1 in the image capture unit 101, and sets the values of a preprocessing parameter and a feature extraction parameter stored in association with the model number 1 in the feature value extraction unit 104. The setting of the image capture condition in the image capture unit 101 may be automated, or may be performed manually by the operator in a state where the image capture condition is displayed on the screen display unit 153. The setting of the image processing condition in the feature value extraction unit 104 may be automated, or may be performed manually by the operator in a state where the image processing condition is displayed on the screen display unit 153.

Next, the image capture unit 101 captures an image of a fine irregularity pattern on the date mark of the product to be registered at least one time under the set image capture condition, and stores the image into the image storage unit 103 (step S123).

Next, the feature value extraction unit 104 retrieves the image of the fine irregularity pattern on the date mark of the product to be registered stored in the image storage unit 103, performs image processing on the image based on the set image processing condition to extract a feature value related to the fine irregularity pattern, and stores the extracted feature value into the feature value storage unit 105 as a registration feature value (step S124). At this time, the feature value storage unit 105 registers an individual-specific feature value so that the feature value is linked to (associated with) information (also referred to as supplementary information) related to the registration target product such as the ID number, registration date, size, and product specifications of the registration target product. By doing so, it becomes possible to present individual management information of a target object such as a product based on the result of judgment of individual identification and individual authentication to be described later.

In the case of further registering another product, the operation of steps S121 to S124 is repeated by the number of products to be registered.

FIG. 23 shows an example of the content of individual registration information stored in the feature value storage unit 105. Feature values PF1, PF2, . . . , PFn and supplementary information SI1, SI2, . . . , SIn are feature values and supplementary information that are one-to-one associated with registration target products.

[Individual Identification and Individual Matching Operation]

Next, an operation to identify and match individual products will be described.

Figure 24:
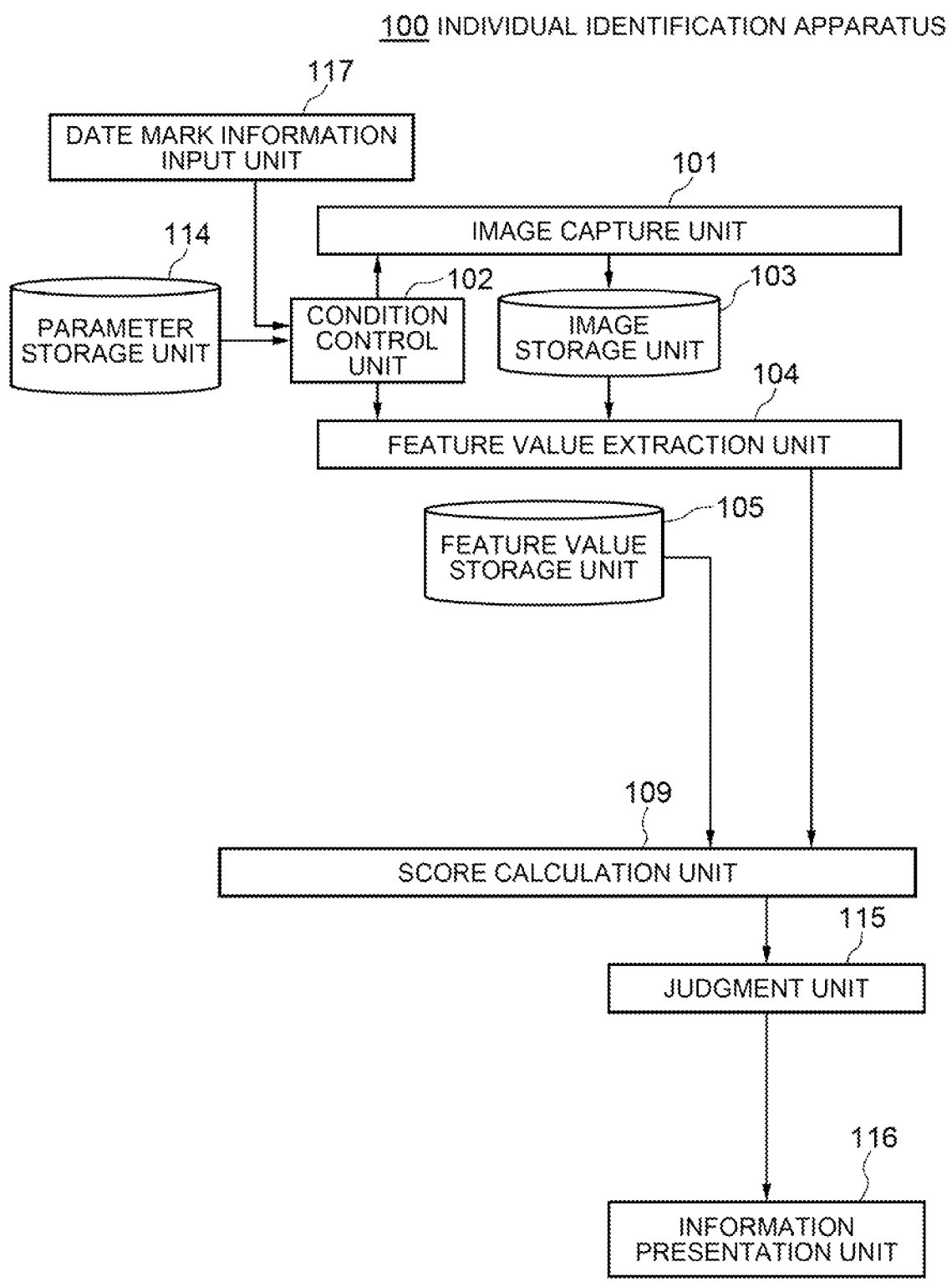
FIG. 24 is an operation flow of individual identification and individual matching in the individual identification apparatus according to the first example embodiment of the present invention.
Figure 25:
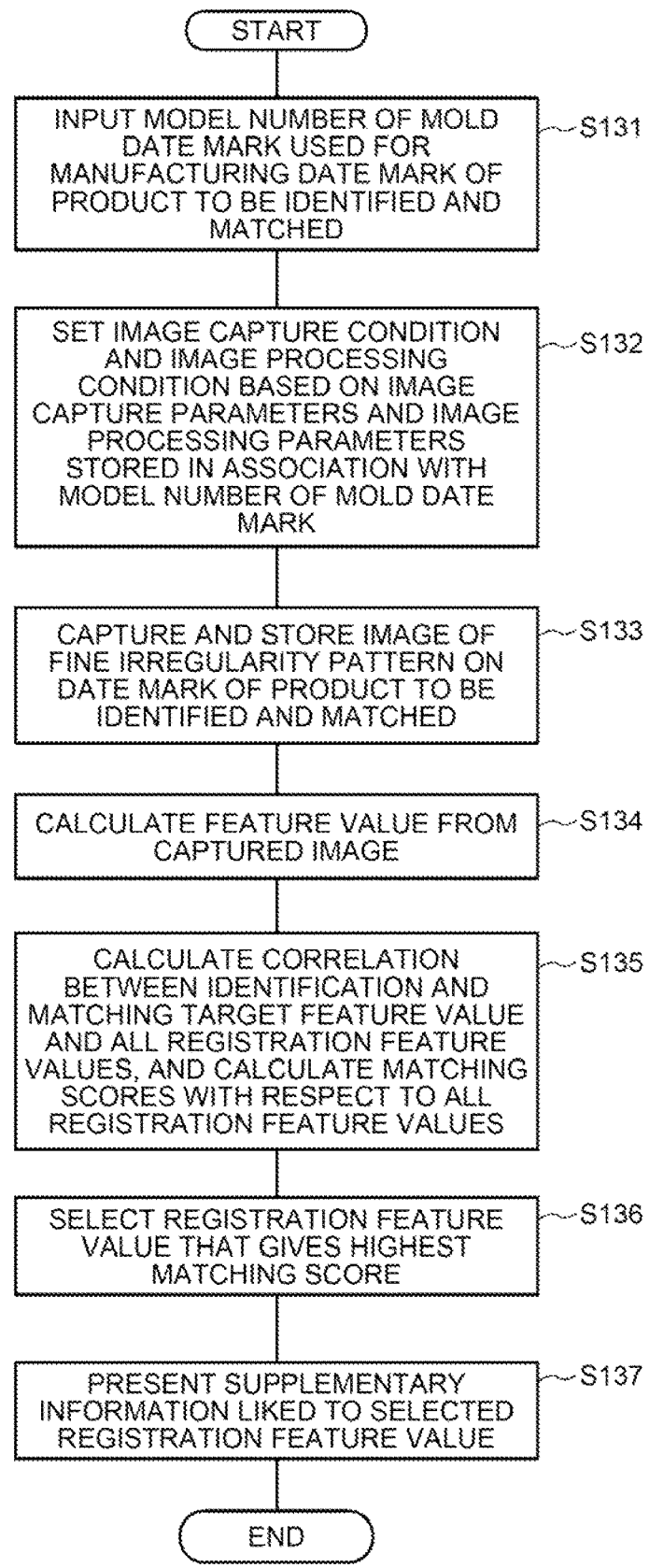
FIG. 25 is a flowchart showing an example of a process of individual identification and individual matching in the individual identification apparatus according to the first example embodiment of the present invention.

FIGS. 24 and 25 are a processing flow and a flowchart of an operation at the time of individual identification and individual matching. First, an operator who manages individual identification and matching inputs the model number of a mold date mark used in forming the date mark of a product to be identified and matched into the condition control unit 102 through the date mark information input unit 117 (step S131).

The condition control unit 102 retrieves the values of image capture parameters and image processing parameters corresponding to the model number input through the date mark information input unit 117 from the parameter storage unit 114, sets an image capture condition determined by the values of the image capture parameters in the image capture unit 101, and sets an image processing condition determined by the values of the image processing parameters in the feature value extraction unit 104 (step S132). For example, in a case where the model number 1 is input, the condition control unit 102 sets an illumination angle and image resolution stored in association with the model number 1 in the image capture unit 101, and sets the values of a preprocessing parameter and a feature extraction parameter stored in association with the model number 1 in the feature value extraction unit 104. The setting of the image capture condition in the image capture unit 101 may be automated, or may be performed manually by the operator in a state where the image capture condition is displayed on the screen display unit 153. Moreover, the setting of the image processing condition in the feature value extraction unit 104 may be automated, or may be performed manually by the operator in a state where the image processing condition is displayed on the screen display unit 153.

Next, the image capture unit 101 captures an image of a fine irregularity pattern on the date mark of the product to be identified and matched at least one time under the set image capture condition, and stores the image into the image storage unit 103 (step S133).

Next, the feature value extraction unit 104 retrieves the image of the fine irregularity pattern on the date mark of the product to be identified and matched stored in the image storage unit 103, performs image processing on the image based on the set image processing condition to extract a feature value related to the fine irregularity pattern, and outputs the feature value to the score calculation unit 109 (step S134). The feature value output from the feature value extraction unit 104 to the score calculation unit 109 is referred to as an individual identification/matching target feature value hereinafter.

Next, the score calculation unit 109 calculates the correlations between the individual identification/matching target feature value and all the feature values PF1 to PFn registered in the feature value storage unit 105, respectively, and calculates matching scores with respect to all the feature values PF1 to PFn (step S135). Next, the judgment unit 115 judges which feature value stored in the feature value storage unit 105 matches the individual identification/matching target feature value based on the matching scores calculated by the score calculation unit 109. For example, the judgment unit 115 sorts the matching scores between the individual identification/matching target feature value and all the registered feature values, and selects a feature value that gives the maximum matching score (the maximum correlation) (step S136). Then, the judgment unit 115 retrieves supplementary information linked to the selected feature value from the feature value storage unit 105, and outputs as product information of the product to be identified and matched.

Further, the judgment unit 115 may judge whether the matching scores between the individual identification/matching target feature value and all the feature values stored in the feature value storage unit 105 exceed a preset threshold value. In a case where any of the matching scores between the individual identification/matching target feature value and all the feature values stored in the feature value storage unit 105 does not exceed the threshold value, the judgment unit 115 judges that the product to be identified and matched is not registered and outputs information representing an authentication error. The judgment unit 115 thus operating can be used for the purpose of individual authentication such as authenticity judgment of a product.

Subsequently, in response to the product information or the authentication error information obtained from the judgment unit 115, the information presentation unit 116 displays the product information that is the result of individual identification of the identification and matching target product and individual authentication information on a display device (not shown), or outputs to an external terminal (step S137).

Next, an effect of this example embodiment will be described.

According to this example embodiment, even if the date marks of a plurality of products display the same content, each of the plurality of products can be identified. The reason is that an individual difference in fine irregularity pattern on a date mark material formed at random at the time of manufacture is used for individual identification.

Figure 26:
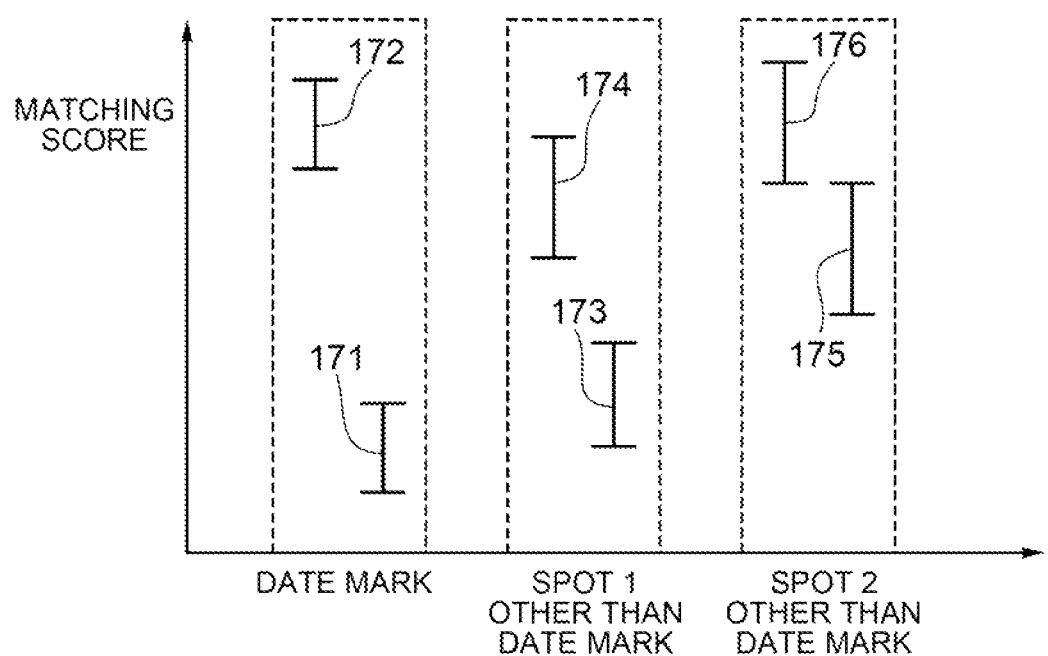
FIG. 26 is a graph showing an example of a result of statistical verification whether or not a plurality of individual products manufactured using product molds incorporating the same mold date marks can be individually identified by the feature values of patterns of fine irregularities on date marks.

FIG. 26 is a graph showing an example of the result of statistical verification whether or not a plurality of individual products manufactured by product molds incorporating the same mold date mark can be individually identified by the feature values of fine irregularity patterns on date marks. The vertical axis of the graph of FIG. 26 shows a matching score, and the horizontal axis shows a matching spot. In a case where the matching spot is the date mark, it is confirmed that a distribution 171 of the matching scores of the same product sample pairs and a distribution 172 of the matching scores of different product sample pairs are completely separated. Besides, two spots other than the date mark, a spot 1 and a spot 2, are selected and the same verification is performed. In a case where the matching spot is the spot 1, a distribution 173 of the matching scores of the same product sample pairs and a distribution 174 of the matching scores of different product sample pairs are completely separated, but the separation degree is smaller than that of the date mark. In a case where the matching spot is the spot 2, a distribution 175 of the matching scores of the same product sample pairs and a distribution 176 of the matching scores of different product sample pairs are not separated, and there is a fear that the matching may fail.

Further, according to this example embodiment, it is possible to limit the manufacturing cost for individual identification. The reason is that since an individual difference in fine irregularity pattern on a date mark material formed at random at the time of manufacture is used for individual identification, it is possible to identify each of a plurality of products even if the date marks of the products display the same content.

Further, according to this example embodiment, it is possible to previously determine an image capture condition and an image processing condition with ease. The reason is that a favorable image capture condition and image processing condition determined based on the mold date mark of a certain model number can be applied to all existing products and new products using mold date marks of the same model number.

Further, according to this example embodiment, it is possible to determine an image capture condition and an image processing condition useful for identification between a plurality of kinds of date marks which are similar to each other. The reason is that this example embodiment includes: the image capture unit 101 that acquires a plurality of images obtained by setting the value of a specific parameter set A of a plurality of kinds of image capture parameters and image processing parameters to a certain candidate value and, while changing the value of a parameter set B that is a disturbance factor such as the posture of an object at the time of image capture, capturing images of N (N≥2, preferably, N≥3) kinds of target objects (date mark of product) a plurality of times, respectively; the feature value extraction unit 104 that extracts a feature value from each of the plurality of images; the feature value pair generation unit 106 that generates a feature value pair extracted from a plurality of images of target objects that two feature values forming the pair are the same kind as a first feature value pair for each of the N kinds of target objects, and generates a feature value pair extracted from a plurality of images of target objects that two feature values forming the pair are mutually different kinds as a second feature value pair for each of all the combinations of the N kinds of object targets; the distribution generation unit 110 that generates a first distribution which is the distribution of matching scores of the plurality of first feature value pairs, and generates a second distribution which is the distribution of matching scores of the second feature value pairs; and the parameter determination unit 113 that determines whether or not to employ the candidate value of the parameter set A based on the separation degree between the first distribution and the second distribution.

In the above description, the individual identification apparatus 100 is configured to determine the specific image capture parameters and image processing parameters by the process shown in FIG. 8 or FIG. 20. However, as a modified example of this example embodiment, the individual identification apparatus 100 may be configured to determine the specific image capture parameters by the process shown in FIG. 8 or FIG. 20 and use predetermined fixed values as the image processing parameters. Alternatively, as another modified example of this example embodiment, the individual identification apparatus 100 may be configured to determine the specific image processing parameters by the process shown in FIG. 8 or FIG. 20 and use predetermined fixed values as the image capture parameters.

Second Example Embodiment

Figure 27:
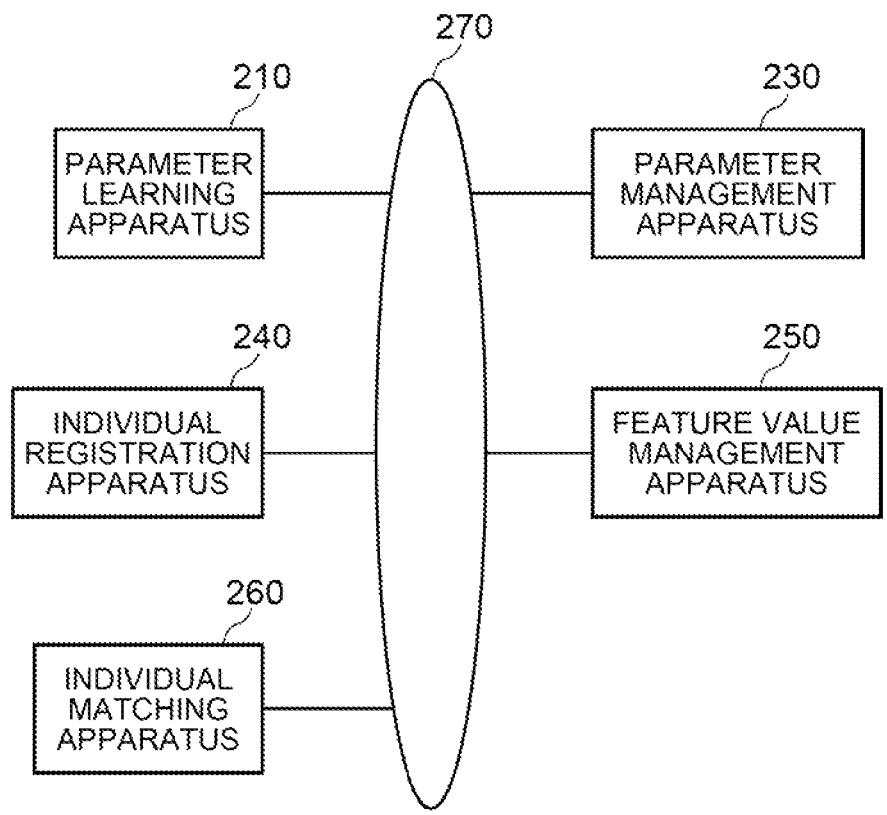
FIG. 27 is a block diagram of an individual identification system according to a second example embodiment of the present invention.

Referring to FIG. 27, an individual identification system 200 according to a second example embodiment of the present invention includes a parameter learning apparatus 210, a parameter management apparatus 230, an individual registration apparatus 240, a feature value management apparatus 250, an individual matching apparatus 260, and a network 270 that connects these apparatuses so that they can communicate with each other. Each of these apparatuses 210, 230, 240, 250, and 260 is configured by one or a plurality of image processing apparatuses such as computers.

The parameter learning apparatus 210 is configured to learn an image capture parameter and an image processing parameter for each mold date mark model number. The parameter learning apparatus 210 is operated by, for example, a company that manufactures or sells a mold date mark.

Figure 28:
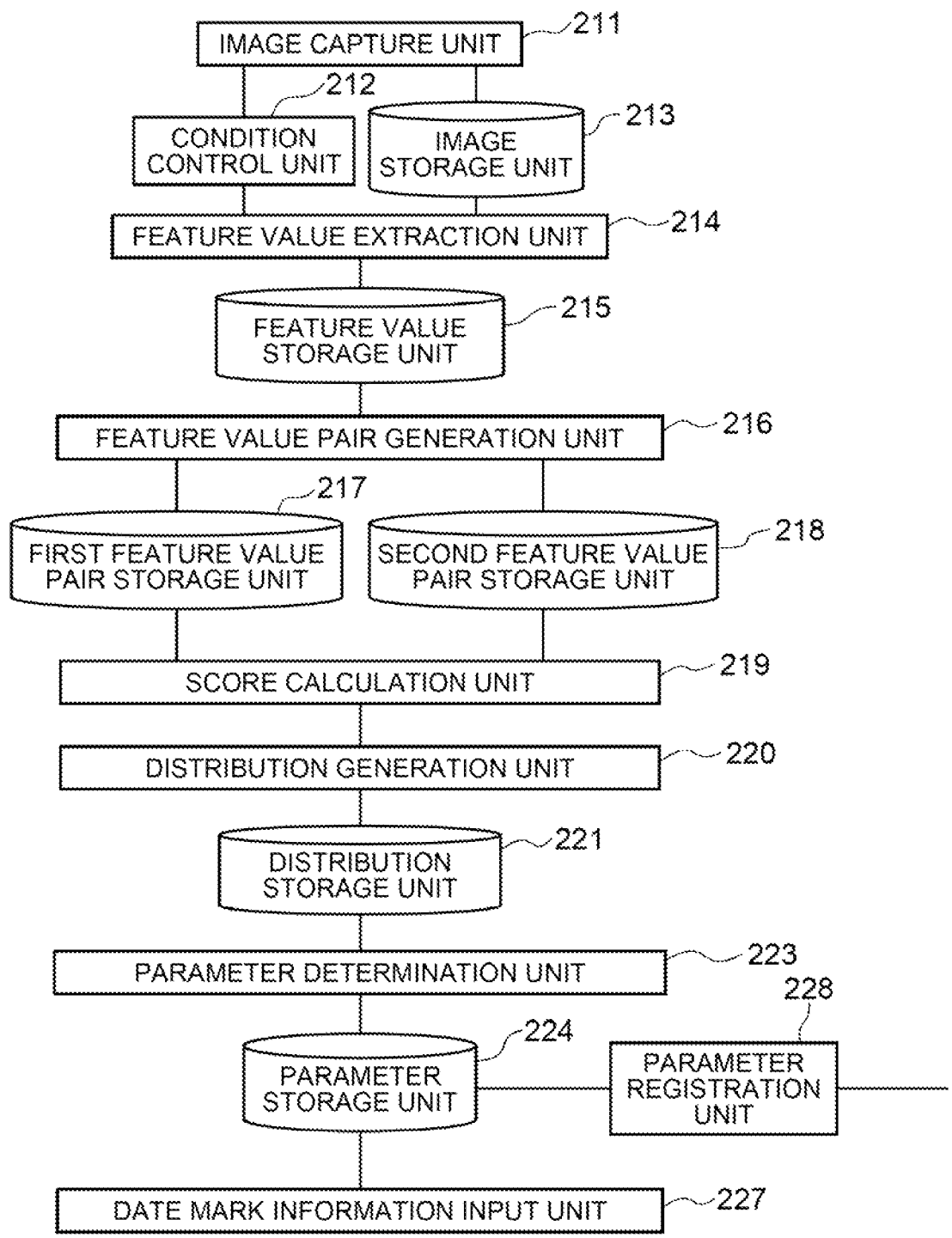
FIG. 28 is a block diagram showing an example of a parameter learning apparatus in the individual identification system according to the second example embodiment of the present invention.

FIG. 28 is a block diagram showing an example of the parameter learning apparatus 210. Referring to FIG. 28, the parameter learning apparatus 210 includes an image capture unit 211, a condition control unit 212, an image storage unit 213, a feature value extraction unit 214, a feature value storage unit 215, a feature value pair generation unit 216, a first feature value pair storage unit 217, a second feature value pair storage unit 218, a score calculation unit 219, a distribution generation unit 220, a distribution storage unit 221, a parameter determination unit 223, a parameter storage unit 224, a date mark information input unit 227, and a parameter registration unit 228. The units other than the parameter registration unit 228 as a whole configure a learning unit. The respective units configuring the learning unit have the same functions as the image capture unit 101, the condition control unit 102, the image storage unit 103, the feature value extraction unit 104, the feature value storage unit 105, the feature value pair generation unit 106, the first feature value pair storage unit 107, the second feature value pair storage unit 108, the score calculation unit 109, the distribution generation unit 110, the distribution storage unit 111, the parameter determination unit 113, the parameter storage unit 114, and the date mark information input unit 117 in the individual identification apparatus 100 shown in FIG. 4.

The parameter registration unit 228 is configured to register the image capture parameter and the image processing parameter learned by the learning unit into the parameter management apparatus 230 in a manner that the parameters are associated with the mold date mark model number.

The parameter management apparatus 230 is configured to store and manage the image capture parameter and the image processing parameter learned by the parameter learning apparatus 210 in a manner that the parameters are associated with the mold date mark model number. The parameter management apparatus 230 is operated by, for example, a company that manufactures or sells a mold date mark or a company that manufactures or sells a product using a mold date mark.

Figure 29:
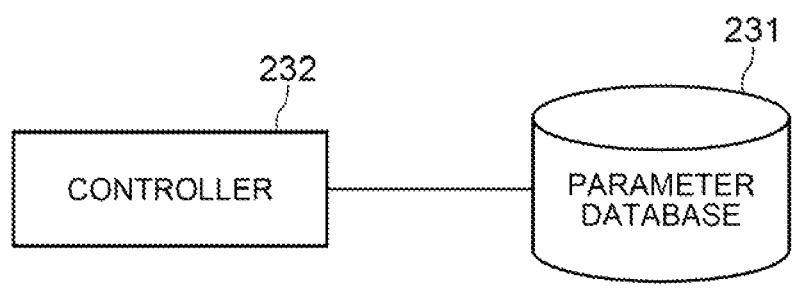
FIG. 29 is a block diagram showing an example of a parameter management apparatus in the individual identification system according to the second example embodiment of the present invention.

FIG. 29 is a block diagram showing an example of the parameter management apparatus 230. Referring to FIG. 29, the parameter management apparatus 230 includes a parameter database 231 and a controller 232. The parameter database 231 is configured to store the image capture parameter and the image processing parameter in a table in a manner that the parameters are associated with the mold date mark model number. For example, one row of the table is composed of one record, and one record is composed of items including a mold date mark model number, an image capture parameter, and an image processing parameter. The controller 232 is configured to perform addition, selection, deletion, and update of data in record units on the parameter database 231 in response to a processing request input from the outside.

The individual registration apparatus 240 is configured to extract a feature value from a date mark image of a registration target product. The individual registration apparatus 240 is operated by, for example, a company that manufactures or sells a product.

Figure 30:
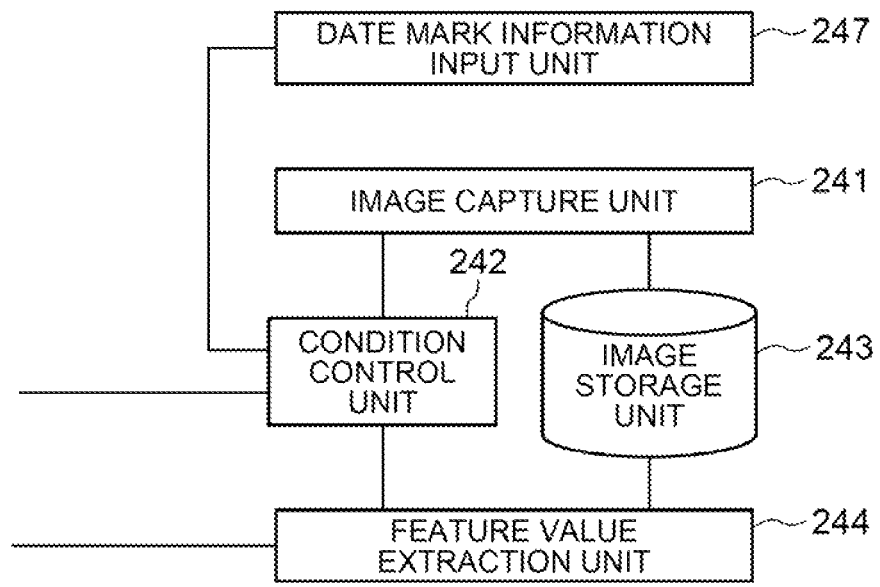
FIG. 30 is a block diagram showing an example of an individual management apparatus in the individual identification system according to the second example embodiment of the present invention.

FIG. 30 is a block diagram showing an example of the individual registration apparatus 240. Referring to FIG. 30, the individual registration apparatus 240 includes an image capture unit 241, a condition control unit 242, an image storage unit 243, a feature value extraction unit 244, and a date mark information input unit 247. These units have the same functions as the image capture unit 101, the condition control unit 102, the image storage unit 103, the feature value extraction unit 104, and the date mark information input unit 117 in the individual identification apparatus 100 shown in FIG. 4.

The feature value management apparatus 250 is configured to associate supplementary information of the registration target product with the feature value of the product extracted by the individual registration apparatus 240, and store and manage. The feature value management apparatus 250 is operated by, for example, a company that manufactures or sells a product.

Figure 31:
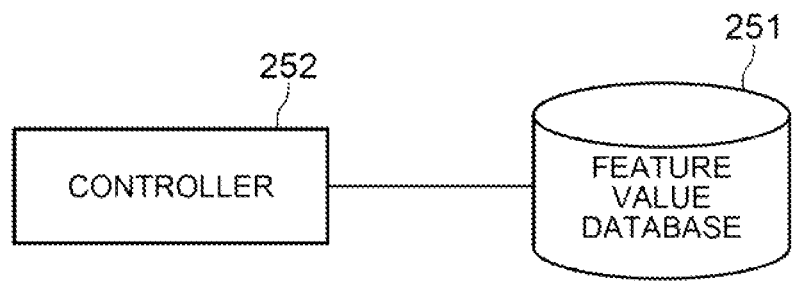
FIG. 31 is a block diagram showing an example of a feature value management apparatus in the individual identification system according to the second example embodiment of the present invention.

FIG. 31 is a block diagram showing an example of the feature value management apparatus 250. Referring to FIG. 31, the feature value management apparatus 250 includes a feature value database 251 and a controller 252. The feature value database 251 is configured to associate supplementary information of the registration target product with the feature value of the product and store into a table. For example, one row of the table is composed of one record, and one record is composed of items including the feature value of a registration target product and the supplementary information of the registration target product. The controller 252 is configured to perform addition, selection, deletion, and update of data in record units on the feature value database 251 in response to a processing request input from the outside.

The individual matching apparatus 260 is configured to extract a feature value from a date mark image of a matching target product, and match the extracted feature value and the feature value of the registration target product stored in the feature value management apparatus 250. The individual matching apparatus 260 is operated by, for example, a company that manufactures or sells a product. Alternatively, the individual matching apparatus 260 is realized by a mobile information terminal such as a smartphone owned by an individual person.

Figure 32:
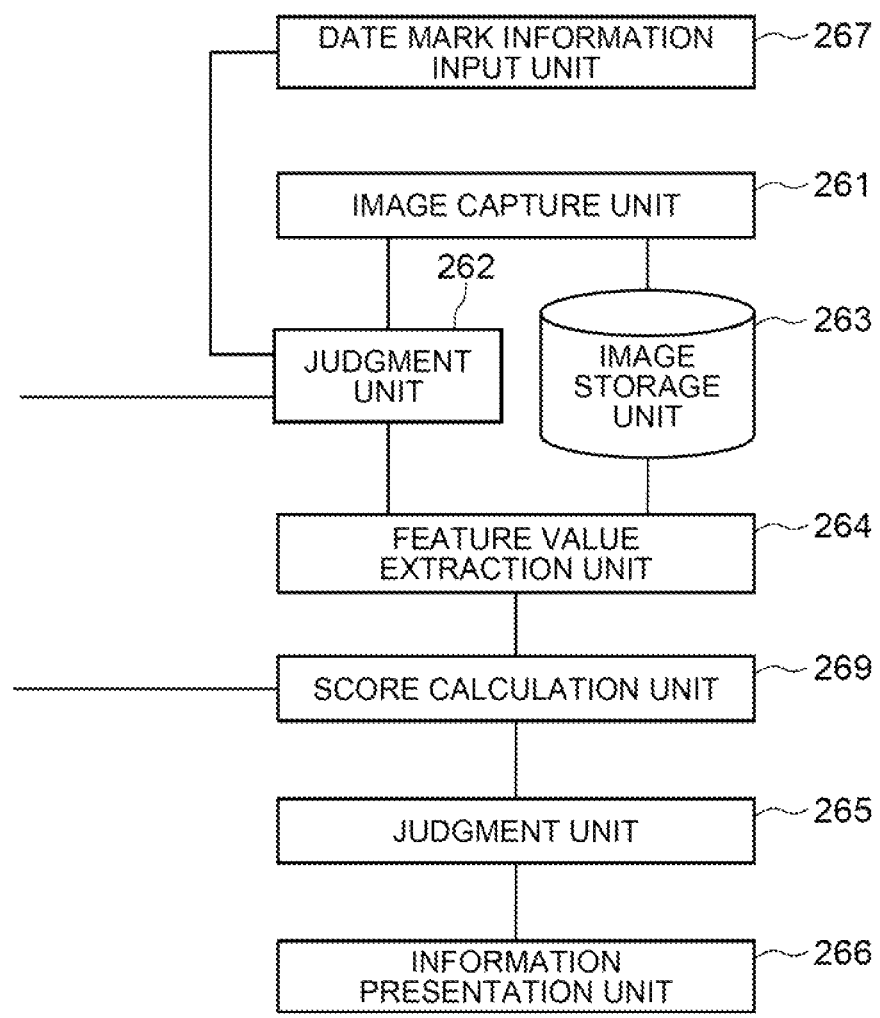
FIG. 32 is a block diagram showing an example of an individual matching apparatus in the individual identification system according to the second example embodiment of the present invention.

FIG. 32 is a block diagram showing an example of the individual matching apparatus 260. Referring to FIG. 32, the individual matching apparatus 260 includes an image capture unit 261, a condition control unit 262, an image storage unit 263, a feature value extraction unit 264, a judgment unit 265, an information presentation unit 266, a date mark information input unit 267, and a score calculation unit 269. These units have the same functions as the image capture unit 101, the condition control unit 102, the image storage unit 103, the feature value extraction unit 104, the judgment unit 115, the information presentation unit 116, and the date mark information input unit 117 in the individual identification apparatus 100 shown in FIG. 4.

Next, an operation of the individual identification system 200 according to this example embodiment will be described. The operation of the individual identification system 200 is classified roughly into the following three:

(a) preprocessing operation to determine the values of specific image capture parameter and image processing parameter;
(b) individual registration operation; and
(c) individual identification and individual matching operation

[Preprocessing Operation to Determine Values of Specific Image Capture Parameter and Image Processing Parameter]

This operation is performed by the parameter learning apparatus 210. The operation of the parameter learning apparatus 210 at this time is basically the same as the preprocessing operation in the individual identification apparatus 100 except the operation of the parameter registration unit 228. The parameter registration unit 228 transmits an addition request to which a record composed of the model number of a mold date mark and an image capture parameter and an image processing parameter corresponding to the model number retrieved from the parameter storage unit 224 is added, to the parameter management apparatus 230. When receiving the addition request, the controller 232 of the parameter management apparatus 230 adds the record added thereto to the table of the parameter database 231. With this, for example, the same data as the data shown in FIG. 9 is stored in the parameter database 231.

[Individual Registration Operation]

This operation is performed by the individual registration apparatus 240. The operation of the individual registration apparatus 240 at this time is basically the same as the individual registration operation in the individual identification apparatus 100 except the following point. The condition control unit 242 transmits a selection process request that indicates the model number of a mold date mark input through the date mark information input unit 247 to the parameter management apparatus 230. The controller 232 of the parameter management apparatus 230 acquires a record having the model number of the mold date mark indicated by the selection process request from the parameter database 231, and returns the acquired record to the condition control unit 242. The condition control unit 242 acquires an image capture parameter and an image processing parameter from the returned record. Moreover, the feature value extraction unit 244 transmits an addition process request to which a record including an extracted feature value and supplementary information is added, to the feature value management apparatus 250. The controller 252 of the feature value management apparatus 250 adds the record added to the addition process request to the table of the feature value database 251. With this, in the feature value database 251, for example, the same data as the data shown in FIG. 23, that is, a feature value and supplementary information corresponding one-to-one to a registration target product are registered.

[Individual Identification and Individual Matching Operation]

This operation is performed by the individual matching apparatus 260. The operation of the individual matching apparatus 260 at this time is basically the same as the individual identification and individual matching operation in the individual identification apparatus 100 except the following point. The condition control unit 262 transmits a selection process request that indicates the model number of a mold date mark input through the date mark information input unit 267 to the parameter management apparatus 230. The controller 232 of the parameter management apparatus 230 acquires a record having the model number of the mold date mark indicated by the selection process request from the parameter database 231, and returns the acquired record to the condition control unit 262. The condition control unit 262 acquires an image capture parameter and an image processing parameter from the returned record. Moreover, the score calculation unit 269 transmits a processing request that requests for acquisition of all the records to the feature value management apparatus 250. The controller 252 of the feature value management apparatus 250 returns all the records of the table of the feature value database 251 to the score calculation unit 269 as a response. The score calculation unit 269 acquires registration feature values and supplementary information from the respective records.

According to this example embodiment, the same effect as in the first example embodiment can be obtained, and the learning operation for determining the values of specific image capture parameter and image processing parameter, the individual registration operation related to a registration product, and the individual identification and matching operation can be shared and executed by a plurality of apparatuses and a plurality of operators.

Third Example Embodiment

Figure 33:
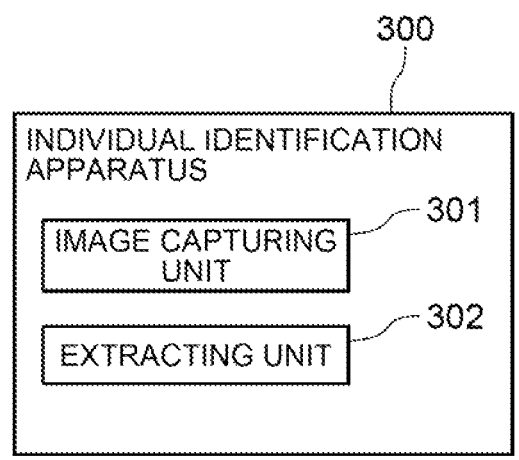
FIG. 33 is a block diagram of an individual identification apparatus according to a third example embodiment of the present invention.

Next, an individual identification apparatus according to a third example embodiment of the present invention will be described. FIG. 33 is a block diagram showing the configuration of an individual identification apparatus 300 in this example embodiment.

Referring to FIG. 33, the individual identification apparatus 300 includes an image capturing unit 301 and an extracting unit 302.

The image capturing unit 301 is configured to acquire an image obtained by capturing a date mark which is formed on a product and which has fine irregularities randomly formed on its base material. The image capturing unit 301 can be configured, for example, in the same manner as the image capture unit 101 shown in FIG. 4, but is not limited thereto. The image capturing unit is also referred to as an imaging unit.

The extracting unit 302 is configured to extract a feature value related to a pattern of fine irregularities from an image acquired by the image capturing unit 301 as data identifying an individual product. The extracting unit 302 can be configured, for example, in the same manner as the feature value extraction unit 104 shown in FIG. 4, but is not limited thereto.

The individual identification apparatus 300 having such a configuration operates in the following manner. First, the image capturing unit 301 acquires an image obtained by capturing a date mark which is formed on a product and which has fine irregularities randomly formed on its base material. Next, the extracting unit 302 extracts a feature value related to a pattern of the fine irregularities from the image acquired by the image capturing unit 301 as data identifying an individual product.

According to the individual identification apparatus 300 that is configured and operates in the above manner, it is possible to limit the manufacture cost for individual identification. The reason is that since an individual difference in pattern of fine irregularities on a date mark material randomly formed at the time of manufacture is used for individual identification, an individual product can be identified even if the date marks of a plurality of products display the same content.

Fourth Example Embodiment

Figure 34:
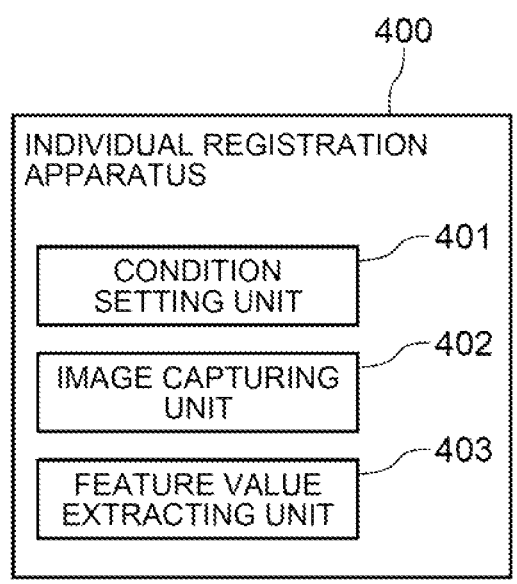
FIG. 34 is a block diagram of an individual registration apparatus according to a fourth example embodiment of the present invention.

Next, an individual registration apparatus according to a fourth example embodiment of the present invention will be described. FIG. 34 is a block diagram showing the configuration of an individual registration apparatus 400 according to this example embodiment.

Referring to FIG. 34, the individual registration apparatus 400 includes a condition setting unit 401, an image capturing unit 402, and a feature value extracting unit 403.

The condition setting unit 401 is configured to acquire an image capture parameter and an image processing parameter corresponding to the model number of a mold date mark used for manufacturing a registration target product from a parameter database, and set an image capture condition and an image processing condition determined by the acquired image capture parameter and image processing parameter. An image capture parameter is a parameter related to a condition for capturing an image of a date mark which is on a product manufactured using a mold date mark and which has fine irregularities randomly formed on its base material. An image processing parameter is a parameter related to a condition for extracting a feature value related to a pattern of the fine irregularities from the image of the date mark. The condition setting unit 401 can be configured, for example, in the same manner as the condition control unit 242 shown in FIG. 30, but is not limited thereto.

The image capturing unit 402 is configured to, under the set image capturing condition, acquire an image obtained by capturing a date mark which is formed on a registration target product and which has fine irregularities randomly formed on its base material. The image capturing unit 402 can be configured, for example, in the same manner as the image capturing unit 241 shown in FIG. 30, but is not limited thereto.

The feature value extracting unit 403 is configured to, under the set image processing condition, extract a feature value related to the pattern of the fine irregularities from the image captured by the image capturing unit 402 as a feature value of the registration target product, and register the feature value into a feature value database. The feature value extracting unit 403 can be configured, for example, in the same manner as the feature value extraction unit 244 shown in FIG. 30, but is not limited thereto.

The individual registration apparatus 400 having such a configuration operates in the following manner. First, the condition setting unit 401 acquires an image capture parameter and an image processing parameter corresponding to the model number of a mold date mark used for manufacturing a registration target product from a parameter database, and sets an image capture condition and an image processing condition determined by the acquired image capture parameter and image processing parameter. Next, under the set image capture condition, the image capturing unit 402 acquires an image obtained by capturing a date mark which is formed on the registration target product and which has fine irregularities randomly formed on its base material. Next, under the set image processing condition, the feature value extracting unit 403 extracts a feature value related to a pattern of the fine irregularities from the image captured by the image capturing unit 402 as the feature value of the registration target product, and registers the feature value into a feature value database.

According to the individual registration apparatus 400 that is configured and operates in the above manner, it is possible to limit the manufacturing cost for individual identification. The reason is that since an individual difference in pattern of fine irregularities on the base material of a date mark randomly formed at the time of manufacture is used for individual identification, it is possible to identify an individual product even if the date marks of a plurality of products display the same content.

Fifth Example Embodiment

Figure 35:
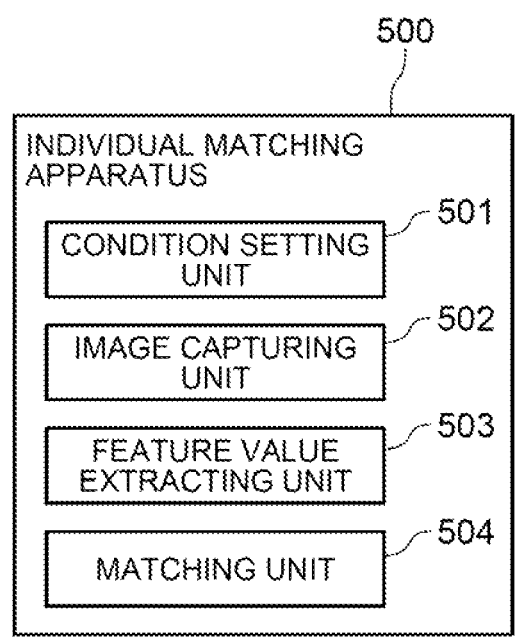
FIG. 35 is a block diagram of an individual matching apparatus according to a fifth example embodiment of the present invention.

Next, an individual matching apparatus according to a fifth example embodiment of the present invention will be described. FIG. 35 is a block diagram showing the configuration of an individual matching apparatus 500 according to this example embodiment.

Referring to FIG. 35, the individual matching apparatus 500 includes a condition setting unit 501, an image capturing unit 502, a feature value extracting unit 503, and a matching unit 504.

The condition setting unit 501 is configured to acquire an image capture parameter and an image processing parameter corresponding to the model number of a mold date mark used for manufacturing a matching target product from a parameter database, and set an image capture condition and an image processing condition determined by the acquired image capture parameter and image processing parameter. An image capture parameter is a parameter related to a condition for capturing a date mark which is on a product manufactured using a mold date mark and which has fine irregularities randomly formed on its base material. An image processing parameter is a parameter related to a condition for extracting a feature value related to a pattern of the fine irregularities from the image of the date mark. The condition setting unit 501 can be configured, for example, in the same manner as the condition control unit 262 shown in FIG. 32, but is not limited thereto.

The image capturing unit 502 is configured to, under the set image capture condition, acquire an image obtained by capturing a date mark which is formed on a matching target product and which has fine irregularities randomly formed on its base material. The image capturing unit 502 can be configured, for example, in the same manner as the image capturing unit 261 shown in FIG. 32, but is not limited thereto.

The feature value extracting unit 503 is configured to, under the set image processing condition, extract a feature value related to a pattern of the fine irregularities from the image captured by the image capturing unit 502 as the feature value of the matching target product. The feature value extracting unit 503 can be configured, for example, in the same manner as the feature value extraction unit 264 shown in FIG. 32, but is not limited thereto.

The matching unit 504 is configured to match the feature value of the matching target product extracted by the feature value extracting unit 503 and a registered feature value. The matching unit 504 can be configured, for example, in the same manner as the score calculation unit 269 and the judgment unit 265 shown in FIG. 32, but is not limited thereto.

The individual matching apparatus 500 having such a configuration operates in the following manner. First, the condition setting unit 501 acquires an image capture parameter and an image processing parameter corresponding to the model number of a mold date mark used for manufacturing a matching target product from a parameter database, and sets an image capture condition and an image processing condition determined by the acquired image capture parameter and image processing parameter. Next, under the set image capture condition, the image capturing unit 502 acquires an image obtained by capturing a date mark which is formed on the matching target product and which has fine irregularities randomly formed on its base material. Next, under the set image processing condition, the feature value extracting unit 503 extracts a feature value related to a pattern of the fine irregularities from the image captured by the image capturing unit 502 as the feature value of the matching target product. Next, the matching unit 504 matches the feature value of the matching target product extracted by the feature value extracting unit 503 and a registered feature value.

According to the individual matching apparatus 500 that is configured and operates in the above manner, it is possible to limit the manufacturing cost for individual identification. The reason is that since an individual difference in pattern of fine irregularities on the base material of a date mark randomly formed at the time of manufacture is used for individual identification, it is possible to identify an individual product even if the date marks of a plurality of products display the same content.

Other Example Embodiment

In the above example embodiments, an image capture parameter and an image processing parameter determined (learned) in advance are associated with the model number of a mold date mark and stored into a memory unit such as a database. However, an image capture parameter and an image processing parameter determined (learned) in advance may be associated with an image of a mold date mark or a display on the image and stored in a memory unit such as a database. According to such a configuration, it is possible to, for example, search a memory unit such as a database by using an image of a date mark of a matching target product or a display on the image as a key, and thereby acquire an image capture parameter and an image processing parameter corresponding to the model number of a mold date mark used for manufacturing the date mark.

Further, a correspondence table between the identification information of a product (for example, the serial number or lot number of a product) and the model number of a mold date mark used for manufacturing the date mark of the product may be stored in advance so as to be referred to by a date mark information inputting unit. According to such a configuration, when the identification information of a product is input instead of the model number of a mold date mark, the date mark information inputting unit can acquire the model number of a mold date mark corresponding to the input identification information of the product with reference to the correspondence table, and output the acquired model number of the mold date mark to a parameter storage unit or a condition control unit.

Although the present invention has been described above with reference to the example embodiments, the present invention is not limited to the example embodiments. The configurations and details of the present invention can be changed in various manners that can be understood by one skilled in the art within the scope of the present invention.

The present invention can be applied to a field of securing the traceability of every kind of product.

The whole or part of the example embodiments can be described as, but not limited to, the following supplementary notes.

[Supplementary Note 1]

An individual identification apparatus that identifies an individual product having a pattern of irregularities randomly formed on a surface thereof, the individual identification apparatus comprising:
  an imaging unit configured to acquire an image obtained by capturing a date mark formed on the product; and
  an extracting unit configured to extract a feature value related to the pattern of the irregularities from the image obtained by capturing the date mark as data identifying the individual product.

[Supplementary Note 2]

The individual identification apparatus according to Supplementary Note 1, further comprising:
  a parameter storing unit in which an image capture parameter is stored for each of model numbers of mold date marks;
  a parameter acquiring unit configured to acquire the image capture parameter associated with a model number of a mold date mark used for forming the date mark from the parameter storing unit; and
  a condition setting unit configured to set an image capture condition determined by the acquired image capture parameter,
  wherein the imaging unit is configured to acquire the image under the set image capture condition.

[Supplementary Note 3]

The individual identification apparatus according to Supplementary Note 2, wherein:
  in the parameter storing unit, an image processing parameter is further stored for each of the model numbers of the mold date marks;
  the parameter acquiring unit is configured to further acquire the image processing parameter associated with the model number of the mold date mark from the parameter storing unit;

the condition setting unit is configured to further set an image processing condition determined by the acquired image processing parameter; and the extracting unit is configured to extract the feature value under the set image processing condition.

[Supplementary Note 4]

The individual identification apparatus according to Supplementary Note 3, further comprising a learning unit configured to learn the image capture parameter and the image processing parameter for each of the model numbers of the mold date marks by using an image obtained by capturing a sample of a date mark manufactured using the mold date mark.

[Supplementary Note 5]

The individual identification apparatus according to any of Supplementary Notes 1 to 4, further comprising a feature value storing unit in which the feature value is stored as a registration feature value.

[Supplementary Note 6]

The individual identification apparatus according to any of Supplementary Notes 1 to 5, further comprising a matching unit configured to match the feature value as a feature value related to matching against a registration feature value.

[Supplementary Note 7]

An individual identification method of identifying an individual product having a pattern of irregularities randomly formed on a surface thereof, the individual identification method comprising:

acquiring an image obtained by capturing a date mark formed on the product; and extracting a feature value related to the pattern of the irregularities from the image obtained by capturing the date mark as data identifying the individual product.

[Supplementary Note 8]

The individual identification method according to Supplementary Note 7, comprising: acquiring, from a parameter storing unit in which an image capture parameter is stored for each of model numbers of mold date marks, the image capture parameter associated with a model number of a mold date mark used for forming the date mark;

setting an image capture condition determined by the acquired image capture parameter, and in acquiring the image, acquiring the image under the set image capture condition.

[Supplementary Note 9]

The individual identification method according to Supplementary Note 7, comprising: acquiring, from a parameter storing unit in which an image capture parameter and an image processing parameter are stored for each of model numbers of mold date marks, the image capture parameter and the image processing parameter associated with a model number of a mold date mark used for forming the date mark;

setting an image capture condition and an image processing condition determined by the acquired image capture parameter and image processing parameter;

in acquiring the image, acquiring the image under the set image capture condition; and in extracting the feature value, extracting the feature value under the set image processing condition.

[Supplementary Note 10]

The individual identification method according to Supplementary Note 9, comprising learning the image capture parameter and the image processing parameter for each of the model numbers of the mold date marks by using an image obtained by capturing a sample of a date mark manufactured using the mold date mark.

[Supplementary Note 11]

The individual identification method according to any of Supplementary Notes 7 to 10, comprising storing the feature value as a registration feature value.

[Supplementary Note 12]

The individual identification method according to any of Supplementary Notes 7 to 11, comprising matching the feature value as a feature value related to matching against a registration feature value.

[Supplementary Note 13]

A non-transitory computer-readable recording medium on which a program is recorded, the program comprising instructions for causing a computer that identifies an individual product having a pattern of irregularities randomly formed on a surface thereof, to perform:

a process of acquiring an image obtained by capturing a date mark formed on the product; and a process of extracting a feature value related to the pattern of the irregularities from the image obtained by capturing the date mark as data identifying the individual product.

[Supplementary Note 14]

An individual registration apparatus comprising:

a condition setting unit configured to, from a parameter database in which, for each model number of a mold date mark, an image capture parameter related to a condition for capturing an image of a date mark of a product manufactured using the mold date mark and an image processing parameter related to a condition for extracting a feature value related to a pattern of irregularities from the image of the date mark are stored so as to be associated with the model number of the mold date mark, acquire the image capture parameter and the image processing parameter associated with a model number of a mold date mark used for manufacturing a registration target product, and set an image capture condition and an image processing condition determined by the acquired image capture parameter and image processing parameter;

an imaging unit configured to acquire an image obtained by capturing a date mark formed on the registration target product under the set image capture condition; and a feature value extracting unit configured to, under the set image processing condition, extract the feature value related to the pattern of the irregularities from the image obtained by capturing the date mark as a feature value of the registration target product, and register into a feature value database.

[Supplementary Note 15]

An individual matching apparatus comprising:

a condition setting unit configured to, from a parameter database in which, for each model number of a mold date mark, an image capture parameter related to a condition for capturing an image of a date mark of a product manufactured using the mold date mark and an image processing parameter related to a condition for extracting a feature value related to a pattern of irregularities from the image of the date mark are stored so as to be associated with the model number of the mold date mark, acquire the image capture parameter and the image processing parameter associated with a model number of a mold date mark used for manufacturing a matching target product, and set an image capture condition and an image processing condition determined by the acquired image capture parameter and image processing parameter;

an imaging unit configured to acquire an image obtained by capturing a date mark formed on the matching target product under the set image capture condition;

a feature value extracting unit configured to, under the set image processing condition, extract the feature value related to the pattern of the irregularities from the image obtained by capturing the date mark as a feature value of the matching target product; and a matching unit configured to match the feature value of the matching target product against a registration feature value.

DESCRIPTION OF NUMERALS 10 product
11 date mark
11a to 11e irregularity
12, 13 logo
20 product
21 date mark
100 individual identification apparatus
101 image capture unit
102 condition control unit
103 image storage unit
104 feature value extraction unit
105 feature value storage unit
106 feature value pair generation unit
107 first feature value pair storage unit
108 second feature value pair storage unit
109 score calculation unit
110 distribution generation unit
111 distribution storage unit
113 parameter determination unit
114 parameter storage unit
115 judgment unit
116 information presentation unit
117 date mark information input unit
150 information processing apparatus
151 imaging unit
152 operation input unit
153 screen display unit
154 communication interface unit
155 storage unit
156 arithmetic logic unit
157 program
161 camera
162 zoom lens
163 illuminator
164 product
165 table
166 illuminator
171 to 176 distribution
200 individual identification system
210 parameter learning apparatus
211 image capture unit
212 condition control unit
213 image storage unit
214 feature value extraction unit
215 feature value storage unit
216 feature value pair generation unit
217 first feature value pair storage unit
218 second feature value pair storage unit
219 score calculation unit
220 distribution generation unit
221 distribution storage unit
223 parameter determination unit
224 parameter storage unit
227 date mark information input unit
228 parameter registration unit
229 learning unit
230 parameter management apparatus
231 parameter database
232 controller
240 individual registration apparatus
241 image capture unit
242 condition control unit
243 image storage unit
244 feature value extraction unit
245 feature value storage unit
250 feature value management unit
251 feature value database
252 controller
260 individual matching apparatus
261 image capture unit
262 condition control unit
263 image storage unit
264 feature value extraction unit
265 judgment unit
266 information presentation unit
267 date mark information input unit
270 network
300 individual identification apparatus
301 image capturing unit
302 extracting unit
400 individual registration apparatus
401 condition setting unit
402 image capturing unit
403 feature value extracting unit
500 individual matching apparatus
501 condition setting unit
502 image capturing unit
503 feature value extracting unit
504 matching unit

What is claimed is:

1. An individual identification apparatus that identifies an individual product manufactured using a product mold including a mold date mark, the individual identification apparatus comprising:

a processor; and a memory storing program instructions executable by the processor to:

acquire an image obtained by capturing a date mark formed on the individual product by the mold date mark;

perform a masking process on the captured date mark to divide the image into a date mark region including the date mark and a background region not including the date mark region;

perform a noise removal process on the date mark region of the image by applying a filter, to remove noise within the date mark region of the image;

perform a sharpening process on the date mark region of the image from which the noise was removed, to improve contrast of the date mark region of the image from which the noise was removed, wherein the date mark region of the image from which the noise was removed and of which the contrast has been improved constitutes a preprocessed date mark region of the image;

extract a feature value related to a pattern of irregularities randomly formed on a surface of the date mark that result from manufacture of the individual item using the product mold from the preprocessed date mark region of the image, as data identifying the individual product as compared to other products manufactured using the product mold including the mold date mark, wherein each of the other products has the date mark that the individual product does but not with the pattern of irregularities that the individual product has, wherein extracting the feature value comprises:

applying a window function on the preprocessed date mark region of the image;

performing a frequency transformation process on the preprocessed date mark region to which the window function has been applied, to transform the preprocessed date mark region into a frequency domain;

selecting a frequency band of the preprocessed date mark region as has been transformed into the frequency domain, the preprocessed date mark region having a plurality of frequency value elements in the selected frequency band;

weighting each frequency value element of the preprocessed date mark region in the selected frequency band, wherein the weighted frequency value elements constitute the extracted feature value.

2. The individual identification apparatus according to claim 1, wherein the memory is further configured to store an image capture parameter for a model number of the mold date mark, and the program instructions are executable by the processor to further:

acquire the image capture parameter associated with the model number of the mold date mark, from the memory; and set an image capture condition determined by the acquired image capture parameter, wherein the image is acquired under the set image capture condition.

3. The individual identification apparatus according to claim 2, wherein:

the memory is further configured to store an image processing parameter for the model number of the mold date marks, and the program instructions are executable by the processor to further:

acquire the image processing parameter associated with the model number of the mold date mark from the memory; and set an image processing condition determined by the acquired image processing parameter wherein the feature value is extracted under the set image processing condition.

4. The individual identification apparatus according to claim 2, wherein the program instructions are executable by the processor to further:

determine, and store in the memory, the image capture parameter for the model number of the mold date mark, wherein the image capture parameter associated with the model number of the mold date mark is determined by:

acquiring a plurality of images by using a value of a specific image capture parameter from among a plurality of types of image capture parameters as a candidate value, and changing values of remaining image capture parameters, such that the plurality of images are obtained by capturing date marks of N (N≥2) types of individual products a plurality of times, where the individual products are manufactured with use of the product mold incorporating the mold date mark of the model number;

extracting a feature value from each of the plurality of images;

for all combinations of the N types of the individual products, generating a feature value pair extracted from the plurality of images of the date marks of the individual products in which two feature values constituting the pair are identical, as a first feature value pair for each of the N types of individual products;

for all combinations of the N types of the individual products, generating a feature value pair extracted from the plurality of images of the date marks of the individual products in which the two feature values constituting the pair are different from each other, as a second feature value pair;

generating a first distribution of matching scores of a plurality of the first feature value pairs;

generating a second distribution of matching scores of a plurality of the second feature value pairs; and determining whether or not to adopt the candidate value based on a separation degree between the first distribution and the second distribution.

5. The individual identification apparatus according to claim 1, wherein the program instructions are executable by the processor to further store the feature value in the memory as a registration feature value.

6. The individual identification apparatus according to claim 1, wherein the program instructions are executable by the processor to further match the feature value as a feature value related to matching against a registration feature value.

7. An individual identification method for identifying an individual product manufactured using a product mold including a mold date mark, the individual identification method comprising:

acquiring, by a processor, an image obtained by capturing a date mark formed on the individual product by the mold date mark;

performing, by the processor, a masking process on the captured date mark to divide the image into a date mark region including the date mark and a background region not including the date mark region;

performing, by the processor, a noise removal process on the date mark region of the image by applying a filter, to remove noise within the date mark region of the image;

performing, by the processor, a sharpening process on the date mark region of the image from which the noise was removed, to improve contrast of the date mark region of the image from which the noise was removed, wherein the date mark region of the image from which the noise was removed and of which the contrast has been improved constitutes a preprocessed date mark region of the image;

extracting, by the processor, a feature value related to a pattern of irregularities randomly formed on a surface of the date mark that result from manufacture of the individual item using the product mold from the preprocessed date mark region of the image, as data identifying the individual product as compared to other products manufactured using the product mold including the mold date mark, wherein each of the other products has the date mark that the individual product does but not with the pattern of irregularities that the individual product has, wherein extracting the feature value comprises:
applying a window function on the preprocessed date mark region of the image;
performing a frequency transformation process on the preprocessed date mark region to which the window function has been applied, to transform the preprocessed date mark region into a frequency domain;
selecting a frequency band of the preprocessed date mark region as has been transformed into the frequency domain, the preprocessed date mark region having a plurality of frequency value elements in the selected frequency band;
weighting each frequency value element of the preprocessed date mark region in the selected frequency band, wherein the weighted frequency value elements constitute the extracted feature value.

8. The individual identification method according to claim 7, further comprising:
acquiring, by the processor and from a memory in which an image capture parameter is stored for a model number of the mold date mark, the image capture parameter associated with the model number of the mold date mark; and
setting, by the processor, an image capture condition determined by the acquired image capture parameter, wherein
the image is acquired under the set image capture condition.

9. The individual identification method according to claim 7, further comprising:
acquiring, by the processor from a memory in which an image capture parameter and an image processing parameter are stored for a model number of the mold date mark, the image capture parameter and the image processing parameter associated with the model number of the mold date mark; and
setting, by the processor, an image capture condition and an image processing condition determined by the acquired image capture parameter and image processing parameter, wherein
the image is acquired under the set image capture condition, and
the feature value is extracted under the set image processing condition.

10. The individual identification method according to claim 8, further comprising:
determining, by the processor and storing in the memory, the image capture parameter for the model number of the mold date mark, wherein
the image capture parameter associated with the model number of the mold date mark is determined by:
acquiring a plurality of images by using a value of a specific image capture parameter from among a plurality of types of image capture parameters as a candidate value, and changing values of remaining image capture parameters, such that the plurality of images are obtained by capturing date marks of N (N≥2) types of individual products a plurality of times, where the individual products are manufactured with use of the product mold incorporating the mold date mark of the model number;
extracting a feature value from each of the plurality of images;
for all combinations of the N types of the individual products, generating a feature value pair extracted from the plurality of images of the date marks of the individual products in which two feature values constituting the pair are identical, as a first feature value pair for each of the N types of individual products;
for all combinations of the N types of the individual products, generating a feature value pair extracted from the plurality of images of the date marks of the individual products in which the two feature values constituting the pair are different from each other, as a second feature value pair;
generating a first distribution of matching scores of a plurality of the first feature value pairs;
generating a second distribution of matching scores of a plurality of the second feature value pairs; and
determining whether or not to adopt the candidate value based on a separation degree between the first distribution and the second distribution.

11. The individual identification method according to claim 7, further comprising:
storing, by the processor, the feature value as a registration feature value in a memory.

12. The individual identification method according to claim 7, further comprising:
matching, by the processor, the feature value as a feature value related to matching against a registration feature value.

13. A non-transitory computer-readable recording medium storing a program executable by a computer to identify an individual product manufactured using a product mold including a mold date mark by:
acquiring an image obtained by capturing a date mark formed on the individual product by the mold date mark;
performing a masking process on the captured date mark to divide the image into a date mark region including the date mark and a background region not including the date mark region;
performing a noise removal process on the date mark region of the image by applying a filter, to remove noise within the date mark region of the image;
performing a sharpening process on the date mark region of the image from which the noise was removed, to improve contrast of the date mark region of the image from which the noise was removed, wherein the date mark region of the image from which the noise was removed and of which the contrast has been improved constitutes a preprocessed date mark region of the image; and
extracting a feature value related to a pattern of irregularities randomly formed on a surface of the date mark that result from manufacture of the individual item using the product mold from the preprocessed date mark region of the image, as data identifying the individual product as compared to other products manufactured using the product mold including the mold date mark, wherein each of the other products has the date mark that the individual product does but not with the pattern of irregularities that the individual product has,
wherein extracting the feature value comprises:
applying a window function on the preprocessed date mark region of the image;
performing a frequency transformation process on the preprocessed date mark region to which the window function has been applied, to transform the preprocessed date mark region into a frequency domain;
selecting a frequency band of the preprocessed date mark region as has been transformed into the frequency domain, the preprocessed date mark region having a plurality of frequency value elements in the selected frequency band;

weighting each frequency value element of the preprocessed date mark region in the selected frequency band, wherein the weighted frequency value elements constitute the extracted feature value.

* * * * *